(12) United States Patent
Wu et al.

(10) Patent No.: US 12,548,802 B2
(45) Date of Patent: Feb. 10, 2026

(54) LITHIUM-ION BATTERY, BATTERY, AND ELECTRIC APPARATUS

(71) Applicant: CONTEMPORARY AMPEREX TECHNOLOGY CO., LIMITED, Ningde (CN)

(72) Inventors: Zeli Wu, Ningde (CN); Changlong Han, Ningde (CN); Bin Jiang, Ningde (CN); Jie Guo, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

(21) Appl. No.: 18/800,152

(22) Filed: Aug. 12, 2024

(65) Prior Publication Data
US 2025/0140895 A1   May 1, 2025

Related U.S. Application Data

(63) Continuation of application No. PCT/CN2024/075983, filed on Feb. 5, 2024.

(30) Foreign Application Priority Data

Oct. 30, 2023  (CN) .......................... 202311422403.0

(51) Int. Cl.
| H01M 10/0525 | (2010.01) |
| H01M 4/525 | (2010.01) |
| H01M 4/58 | (2010.01) |
| H01M 10/0567 | (2010.01) |
| H01M 10/0568 | (2010.01) |
| H01M 10/0569 | (2010.01) |
| H01M 10/42 | (2006.01) |
| H01M 4/02 | (2006.01) |

(52) U.S. Cl.
CPC ....... H01M 10/4235 (2013.01); H01M 4/525 (2013.01); H01M 4/5825 (2013.01); H01M 10/0525 (2013.01); H01M 10/0567 (2013.01); H01M 10/0568 (2013.01); H01M 10/0569 (2013.01); H01M 2004/028 (2013.01); H01M 2300/004 (2013.01)

(58) Field of Classification Search
None
See application file for complete search history.

(56) References Cited

U.S. PATENT DOCUMENTS

| 2002/0150820 A1 | 10/2002 | Kanai et al. | |
| 2009/0142663 A1* | 6/2009 | Takeuchi | .......... H01M 10/0567 429/188 |
| 2009/0286164 A1* | 11/2009 | Wada | .................... H01M 4/131 429/338 |
| 2010/0173199 A1 | 7/2010 | Hiraki et al. | |
| 2014/0113200 A1 | 4/2014 | Seymour | |
| 2014/0242468 A1 | 8/2014 | Song et al. | |
| 2017/0179484 A1 | 6/2017 | Park et al. | |
| 2018/0277846 A1 | 9/2018 | Oono et al. | |
| 2019/0356015 A1 | 11/2019 | Zhang et al. | |
| 2020/0006767 A1 | 1/2020 | Du | |
| 2020/0152964 A1 | 5/2020 | Li | |
| 2020/0243911 A1 | 7/2020 | Kuwajima | |
| 2021/0075006 A1 | 3/2021 | Nakayama | |
| 2021/0083282 A1 | 3/2021 | Li | |
| 2021/0194060 A1 | 6/2021 | Liang et al. | |
| 2021/0242498 A1 | 8/2021 | Li | |
| 2022/0059837 A1 | 2/2022 | Shen | |
| 2022/0093920 A1 | 3/2022 | Posco et al. | |
| 2022/0166018 A1 | 5/2022 | Li et al. | |
| 2022/0190333 A1 | 6/2022 | Takamori et al. | |
| 2023/0282824 A1 | 9/2023 | Xie et al. | |
| 2024/0204184 A1* | 6/2024 | Noh | .................... H01M 10/052 |

FOREIGN PATENT DOCUMENTS

| CN | 104995784 A | 10/2015 |
| CN | 106099174 A | 11/2016 |
| CN | 108963337 A | 12/2018 |
| CN | 109075327 A | 12/2018 |
| CN | 109417200 A | 3/2019 |
| CN | 111092199 A | 5/2020 |
| CN | 111430689 A | 7/2020 |
| CN | 113422105 A | 9/2021 |
| CN | 114221035 A | 3/2022 |
| CN | 114284560 A | 4/2022 |
| CN | 114300735 A | 4/2022 |
| CN | 114843512 A | 8/2022 |
| CN | 114864922 A | 8/2022 |
| CN | 115548444 A | 12/2022 |
| CN | 116207351 A | 6/2023 |

(Continued)

OTHER PUBLICATIONS

Fujuan Han, Zenghua Chang, Xingge Liu, Alin Li, Jing Wang, Haiyang Ding, Shigang Lu. Research Status of Low-Temperature Electrolyte Additives for Lithium-ion Batteries, J. Phys.: Conf. Ser. 2009 012069, 2021. (Year: 2021).*
International Search Report received in the corresponding International Application PCT/CN2024/075983, mailed Jun. 3, 2024.
International Search Report received in the corresponding International Application PCT/CN2024/084160, mailed Jul. 6, 2024.
First office action received in the corresponding Chinese application 202311422403.0, mailed on Dec. 4, 2023.
RA of CEVC7-250Ah-BEV, CATL, dated Jul. 2022.
Non-Final Office Action received in the corresponding U.S. Appl. No. 18/800,159, mailed on Oct. 4, 2024, 18 pages.

(Continued)

Primary Examiner — Carlos Barcena
(74) Attorney, Agent, or Firm — K&L Gates LLP

(57) ABSTRACT

This application relates to a lithium-ion battery, a battery, and an electric apparatus. The lithium-ion battery includes an electrolyte and a positive electrode plate. The electrolyte includes lithium salt, the lithium salt includes lithium hexafluorophosphate, and a mass proportion of the lithium hexafluorophosphate relative to a total mass of the electrolyte is 15% to 20%. The positive electrode plate includes a positive electrode current collector and a positive electrode film layer disposed on at least one side of the positive electrode current collector and containing a positive electrode active material. This application can improve cycling performance of the lithium-ion battery.

19 Claims, 2 Drawing Sheets

(56) References Cited

FOREIGN PATENT DOCUMENTS

| | | |
|---|---|---|
| CN | 116314584 A | 6/2023 |
| CN | 116315090 A | 6/2023 |
| CN | 116364860 A | 6/2023 |
| CN | 117154188 A | 12/2023 |
| CN | 117613386 A | 2/2024 |
| JP | 2008210767 A | 9/2008 |
| JP | 6701511 B2 | 5/2020 |
| JP | 2021044136 A | 3/2021 |
| JP | 2023513558 A | 3/2023 |
| JP | 2025505532 A | 2/2025 |
| JP | 2025506352 A | 3/2025 |
| WO | 2015096272 A1 | 7/2015 |
| WO | 2023/027547 A1 | 3/2023 |
| WO | 2023/059073 A1 | 4/2023 |
| WO | 2024/153255 A1 | 7/2024 |
| WO | 2024/153269 A2 | 7/2024 |

OTHER PUBLICATIONS

The First Office Action received in the corresponding Chinese Application 202480001151.0, mailed on Nov. 4, 2024.

Yang, Yuanying, "Research on Magnesium Trifluoromethanesulfonate and Magnesium Bis (Diisopropyl)Amide-Based Electrolytes for Rechargeable Magnesium-Sulfur Battery", Dissertation Submitted to Shanghai Jiao Tong University for the Degree of Master, Apr. 2020.

Final Office Action issued to related U.S. Appl. No. 18/800,159, dated Jan. 17, 2025, 20 pages.

The Non-Final Office Action received in the corresponding U.S. Appl. No. 18/800,159, dated Apr. 25, 2025, 27 pages.

The Notice of Registration received in the corresponding CN application 202480001151.0, dated Mar. 19, 2025, 5 pages with English translation.

Notice of Reasons for Refusal (with English Machine Translation), mailed Jun. 24, 2025, for Japanese Patent Application Serial No. 2024-543966.

Notice of Reasons for Refusal (with English Machine Translation), mailed Jun. 24, 2025, for Japanese Patent Application Serial No. 2024-543931.

The extended European search report received in the corresponding EP Application No. 24744424.3, dated Oct. 23, 2025, 14 pages.

The extended European search report received in the corresponding EP Application No. 24744438.3, dated Oct. 23, 2025, 14 pages.

Tatara Ryoichi et al: "Enhanced Cycling Performance of Ni-Rich Positive Electrodes (NMC) in Li-Ion Batteries by Reducing Electrolyte Free-Solvent Activity", ACS Applied Materials & Interfaces, vol. 11, No. 38, Aug. 21, 2019 (Aug. 21, 2019), pp. 34973-34988, XP093322583, United States, ISSN: 1944-8244, DOI: 10.1021/acsami.9b11942.

Anonymous Jiayi et al: "Doping Strategy in Nickel-Rich Layered Oxide Cathode for Lithium-Ion Battery Renewables", Renewables, vol. 1, No. 3, Jun. 15, 2023 (Jun. 15, 2023), pp. 316-340, XP093322621, ISSN: 2958-1853, DOI: 10.31635/renewabes.023.202200022.

Das Dhrubajyoti et al: "Electrolytes, Additives and Binders for NMC Cathodes in Li-Ion Batteries-A Review", Batteries, vol. 9, No. 4, Mar. 24, 2023 (Mar. 24, 2023), p. 193, XP093322785, Basel ISSN: 2313-0105, DOI: 10.339/batteries9040193.

The Notice of Reasons for Refusal received in the corresponding JP Application No. 2024-543931, dated Nov. 25, 2025, 11 pages with English translation.

\* cited by examiner

LITHIUM-ION BATTERY, BATTERY, AND ELECTRIC APPARATUS

CROSS-REFERENCE TO RELATED APPLICATIONS

This application is a continuation of International Application No. PCT/CN2024/075983, filed on Feb. 5, 2024, which claims priority to Chinese patent application 202311422403.0, filed on Oct. 30, 2023 and entitled "LITHIUM-ION BATTERY, BATTERY, AND ELECTRIC APPARATUS", the entire contents of which are incorporated herein by reference.

TECHNICAL FIELD

This application relates to a lithium-ion battery, a battery, and an electric apparatus.

BACKGROUND

With the characteristics such as high capacity and long service life, lithium-ion batteries are widely used in electronic devices, such as mobile phones, laptop computers, battery motorcycles, electric vehicles, electric airplanes, electric ships, electric toy cars, electric toy ships, electric toy airplanes, and electric tools. As lithium-ion batteries have made great strides, higher demands have been placed on the performance of lithium-ion batteries.

However, the cycling performance of lithium-ion batteries is still poor.

SUMMARY

This application provides a lithium-ion battery, a battery, and an electric apparatus, so as to address the problem of poor cycling performance of existing lithium-ion batteries.

According to a first aspect, an embodiment of this application proposes a lithium-ion battery. The lithium-ion battery includes an electrolyte and a positive electrode plate. The electrolyte includes lithium salt, the lithium salt includes lithium hexafluorophosphate, and a mass proportion of the lithium hexafluorophosphate relative to a total mass of the electrolyte is 15% to 20%. The positive electrode plate includes a positive electrode current collector and a positive electrode film layer disposed on at least one side of the positive electrode current collector and containing a positive electrode active material. The positive electrode active material includes a compound with a molecular formula $Li_dNi_aCo_bMn_cM_{(1-a-b-c)}Q_z$, where $0<d\leq2.1$, $0.6<a<1$, $0<b<1$, $0<c<1$, $0.6<a+b+c<1$, and $1.8\leq z\leq3.5$; element M includes at least one of elements B, Mg, Al, Si, P, S, Ca, Sc, Ti, V, Cr, Fe, Cu, Zn, Sr, Y, Zr, Nb, Mo, Cd, Sn, Sb, Te, Ba, Ta, W, Yb, La, and Ce; and element Q includes at least one of elements O and F.

Therefore, a proportion of element nickel in the positive electrode active material of the embodiments of this application is relatively high. To improve the structural stability of the positive electrode active material, the positive electrode active material of the embodiments of this application further includes element M. The introduction of element M can enhance the crystal structure stability of the positive electrode active material, thereby improving the cycling performance of the lithium-ion battery. However, during cycling, there is a risk of dissolution of both metal and non-metal elements in the positive electrode active material. These dissolved metal and non-metal elements can migrate through the electrolyte to the surface of the negative electrode plate to cause damage to the solid electrolyte interphase (Solid Electrolyte Interphase, SEI) film on the surface of the negative electrode plate, and may precipitate as elemental metal on the surface of the negative electrode plate, thereby deteriorating the cycling performance. The embodiments of this application further employ a high content of lithium hexafluorophosphate, with a mass proportion of lithium hexafluorophosphate $LiPF_6$ relative to the total mass of the electrolyte being 15% to 20%. The high content of lithium hexafluorophosphate can form a protective layer primarily composed of lithium fluoride LiF on the surface of the positive electrode active material, which can mitigate the dissolution of metal and non-metal elements to some extent, thereby further improving the cycling performance of the lithium-ion battery.

In some embodiments, element M includes at least one of elements Ti and Zr; and the electrolyte includes a first additive, where the first additive includes at least one of lithium difluoroxalate borate LiDFOB and lithium tetrafluoroborate $LiBF_4$.

Thus, in the later stage of cycling of the lithium-ion battery, there is a risk of metal ions such as Ti and Zr ions in the positive electrode active material dissolving into the electrolyte and migrating to the surface of the negative electrode plate. The first additive contains fluoride ions and boron ions, and the fluoride ions and boron ions have a strong ability of binding with the above metal ions, reducing the risk of metal ions migrating to the surface of the negative electrode plate, thereby improving the cycling performance of the lithium-ion battery. Additionally, although Ti and Zr ions can improve the structural stability of the material, they may adversely affect the conduction of lithium ions within the lattice, leading to power degradation. The first additive can also compensate for the power degradation caused by Ti and Zr ions.

In some embodiments, element M includes elements Ti and Zr. When M includes both the elements Ti and Zr, the combined use of the two elements can further stabilize the material structure and improve the cycling performance.

In some embodiments, based on a total mass of the positive electrode active material, a mass proportion of element Ti is 100 ppm to 600 ppm; and/or based on the total mass of the positive electrode active material, a mass proportion of element Zr is 500 ppm to 2550 ppm; and based on the total mass of the electrolyte, a mass proportion of the first additive is 30 ppm to 1200 ppm, optionally 100 ppm to 400 ppm.

In some embodiments, the positive electrode active material includes single crystal particles, where the single crystal particle includes an inner region and an outer region, where the outer region is a region extending 500 nm directly from any point on an outer surface of the single crystal particle toward inside of the single crystal particle; and element M includes element Al, where elements Al are distributed at least in the outer region. The distribution of element aluminum Al at least in the outer region helps to form aluminum oxide $Al_2O_3$ in the positive electrode active material, which can passivate side reactions between the positive electrode active material and the electrolyte, further enhancing the structural stability of the positive electrode active material and improving the cycling performance of the lithium-ion battery.

In some embodiments, the electrolyte includes a second additive, where the second additive includes lithium difluorophosphate. Lithium difluorophosphate $LiPO_2F_2$, combined with the element Al in the positive electrode active material, can reduce the DCR on the surface of the positive electrode active material and enhance the interface power.

In some embodiments, based on the total mass of the positive electrode active material, a mass proportion of element Al is 500 ppm to 3000 ppm; and based on the total mass of the electrolyte, a mass proportion of the second additive is 100 ppm to 3000 ppm.

In some embodiments, element M further includes at least one of elements P, S, and B, where at least one of elements P, S, and B is distributed in the outer region; and the electrolyte includes a third additive, and the third additive includes lithium fluorosulfonate. Elements phosphorus P, sulfur S, and boron B can embed in the oxygen layer, playing a role in stabilizing lithium, thereby enhancing the structural stability of the positive electrode active material and improving the cycling performance of the lithium-ion battery.

In some embodiments, based on the total mass of the positive electrode active material, a total mass proportion of elements P, S, and B is 10 ppm to 800 ppm; and based on the total mass of the electrolyte, a mass proportion of the third additive is 50 ppm to 200 ppm. The third additive, combined with the elements phosphorus P, sulfur S, and boron B in the positive electrode active material, can reduce the DCR on the surface of the positive electrode active material and enhance the interface power.

In some embodiments, the electrolyte includes cyclic carbonate, and based on the total mass of the electrolyte, a ratio of a mass proportion of the cyclic carbonate to the mass proportion of the lithium hexafluorophosphate is (0.60-2.50):1, optionally (1.00-1.65):1. The ratio of the mass proportion of the cyclic carbonate to the mass proportion of the lithium hexafluorophosphate being within the above range is conducive to fully dissociating more lithium ions from the lithium hexafluorophosphate, so that even at the end stage of low-SOC discharge, the electrolyte system can still contain a large number of lithium ions, and lithium ions are allowed to be continuously dissociated as the battery reaction proceeds, thereby improving the power performance of the battery.

In some embodiments, based on the total mass of the electrolyte, the mass proportion of the cyclic carbonate is 20% to 30%; and/or the cyclic carbonate includes at least one of ethylene carbonate EC, propylene carbonate PC, and butylene carbonate BC. The cyclic carbonate has a high dielectric constant and high ionic conductivity, allowing stable SEI films to be formed on the surface of the negative electrode active material.

In some embodiments, the lithium-ion battery further includes a negative electrode plate, where the negative electrode plate includes a negative electrode current collector and a negative electrode film layer disposed on at least one side of the negative electrode current collector and containing a negative electrode active material, the negative electrode active material includes element carbon and element silicon, and based on a total mass of the negative electrode active material, a ratio of a mass proportion of the element silicon to a mass proportion of the element carbon is (0.3:99.7) to (3:97).

Thus, the negative electrode active material includes both a carbon-based material and a silicon-based material. Compared with the carbon-based material, the silicon-based material has higher lithium intercalation and deintercalation voltage plateau. Therefore, even at a low SOC (for example, SOC≤10%), the silicon-based material can still participate in discharge, compensating for the difficulty/inability of carbon-based materials to continue discharging at a low SOC, improving the direct current resistance DCR during the discharge process of the battery, and thus improving the power performance during the discharge process of the battery. The electrolyte in the embodiments of this application also uses 15% to 20% lithium hexafluorophosphate. The synergistic effect of the electrolyte and the negative electrode improves the power performance of the battery at the end stage of discharge.

In some embodiments, the electrolyte includes fluorinated cyclic carbonate, and a ratio of a mass proportion of the fluorinated cyclic carbonate relative to the total mass of the electrolyte to the mass proportion of the element silicon is (0.5-9.5):1, optionally (1-2):1.

Thus, fluorinated cyclic carbonate can participate in forming the SEI film on the surface of the negative electrode active material, improving the composition and properties of the film, and effectively protecting the negative electrode active material. Especially in a case of the negative electrode containing silicon, due to the expansion characteristics of silicon, it is more necessary to optimize the composition of the SEI film. The optimization of the film composition is controlled by adjusting the relative proportion of the film-forming additive in the electrolyte. The film formed with the participation of fluorinated cyclic carbonate can improve the flexibility of the SEI film, alleviating the structural collapse caused by the rapid release of a large number of lithium ions from silicon at the end stage of discharge. Moreover, fluorinated cyclic carbonate has a certain desolvation ability, which is conducive to the migration of lithium ions, reducing the DCR at a low SOC and enhancing the discharge power.

In some embodiments, based on the total mass of the electrolyte, the mass proportion of the fluorinated cyclic carbonate is 0.95% to 5.8%, optionally 1.5% to 3%; and/or the fluorinated cyclic carbonate includes at least one of monofluoroethylene carbonate FEC, difluoroethylene carbonate DFEC, and trifluoropropylene carbonate TFPC; and optionally, the fluorinated cyclic carbonate includes monofluoroethylene carbonate FEC.

In some embodiments, a ratio of a press density of the positive electrode film layer to a press density of the negative electrode film layer is (2-2.5):1. Optionally, the press density of the positive electrode film layer is 3.0 g/cm$^3$ to 3.5 g/cm$^3$, and the press density of the negative electrode film layer is 1.3 g/cm$^3$ to 1.7 g/cm$^3$.

In some embodiments, the electrolyte further includes a fourth additive, and the fourth additive includes at least one of 1,3-propane sultone PS, vinylene carbonate VC, and lithium fluorosulfonate LiSO$_3$F. The above components can participate in forming the SEI film on the surface of the negative electrode active material, allowing the SEI film to effectively alleviate the swelling of the silicon-based material.

In some embodiments, based on the total mass of the electrolyte, a mass proportion of 1,3-propane sultone PS is 0.1% to 1%; and/or based on the total mass of the electrolyte, a mass proportion of vinylene carbonate VC is 0.1% to 1%; and/or based on the total mass of the electrolyte, a mass proportion of lithium fluorosulfonate LiSO$_3$F is 0.1% to 1%.

According to a second aspect, this application further proposes a battery including the lithium-ion battery according to any embodiment of the first aspect of this application.

According to a third aspect, this application further proposes an electric apparatus including the battery according to any embodiment of the second aspect of this application.

BRIEF DESCRIPTION OF DRAWINGS

To describe the technical solutions in the embodiments of this application more clearly, the following briefly describes the accompanying drawings required for describing the embodiments of this application. Apparently, the accompanying drawings described below show merely some embodiments of this application, and persons of ordinary skill in the art may still derive other drawings from the accompanying drawings without creative efforts.

Figure 1:
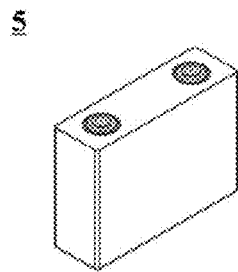
FIG. 1 is a schematic diagram of an embodiment of a lithium-ion battery according to this application.

The accompanying drawings are not necessarily drawn to scale.

REFERENCE SIGNS 1. battery pack; 2. upper box body; 3. lower box body; 4. battery module;
5. lithium-ion battery; 51. housing; 52. electrode assembly;
53. cover plate;
6. electric apparatus.

DESCRIPTION OF EMBODIMENTS

The following specifically discloses embodiments of a lithium-ion battery, a battery, and an electric apparatus in this application with appropriate reference to detailed descriptions of accompanying drawings. However, there may be cases where unnecessary detailed descriptions are omitted. For example, detailed descriptions of well-known matters and repeated descriptions of actually identical structures have been omitted. This is to avoid unnecessarily prolonging the following description, for ease of understanding by persons skilled in the art. In addition, the accompanying drawings and the following descriptions are provided for persons skilled in the art to fully understand this application and are not intended to limit the subject described in the claims.

"Ranges" disclosed in this application are defined in the form of lower and upper limits. A given range is defined by one lower limit and one upper limit selected, where the selected lower and upper limits define boundaries of that particular range. Ranges defined in this method may or may not include end values, and any combinations may be used, meaning any lower limit may be combined with any upper limit to form a range. For example, if ranges of 60-120 and 80-110 are provided for a specific parameter, it is understood that ranges of 60-110 and 80-120 can also be envisioned. In addition, if minimum values of a range are given as 1 and 2, and maximum values of the range are given as 3, 4, and 5, the following ranges can all be envisioned: 1-3, 1-4, 1-5, 2-3, 2-4, and 2-5. In this application, unless otherwise stated, a value range of "a-b" is a short representation of any combination of real numbers between a and b, where both a and b are real numbers. For example, a value range of "0-5" means that all real numbers in the range of "0-5" are listed herein, and "0-5" is just a short representation of a combination of these values. In addition, a parameter expressed as an integer greater than or equal to 2 is equivalent to disclosure that the parameter is, for example, an integer among 2, 3, 4, 5, 6, 7, 8, 9, 10, 11, 12, and so on.

Unless otherwise specified, all the embodiments and optional embodiments of this application can be combined with each other to form new technical solutions.

Unless otherwise specified, all the technical features and optional technical features of this application can be combined with each other to form new technical solutions.

Unless otherwise specified, all the steps in this application can be performed sequentially or randomly, and preferably, are performed sequentially. For example, a method including steps (a) and (b) indicates that the method may include steps (a) and (b) performed in order or may include steps (b) and (a) performed in order. For example, the foregoing method may further include step (c), which indicates that step (c) may be added to the method in any ordinal position, for example, the method may include steps (a), (b), and (c), steps (a), (c), and (b), steps (c), (a), and (b), or the like.

Rechargeable batteries typically include ion-type batteries and metal-type batteries. Metal-type batteries, such as lithium metal batteries and sodium metal batteries, have highly active negative electrodes and a high risk of dendrite formation, which reduces the reliability of the batteries. Ion-type batteries are widely used due to their high reliability.

Lithium-ion batteries typically include an electrode assembly and an electrolyte. The electrode assembly includes a positive electrode plate, a negative electrode plate, and a separator. The separator is disposed between the positive electrode plate and the negative electrode plate to separate them. The positive electrode plate includes a positive electrode film layer containing a positive electrode active material. The positive electrode active material acts as a donor of lithium ions in the lithium-ion battery. The negative electrode plate includes a negative electrode film layer containing a negative electrode active material. The negative electrode active material can act as an acceptor of lithium ions. The electrolyte provides a path for lithium ions to migrate between the positive electrode plate and the negative electrode plate.

To improve the energy density of lithium-ion batteries, the positive electrode active material with high capacity is usually used, for example, by increasing the proportion of element nickel in the positive electrode active material. However, as the proportion of element nickel increases, the structure of the positive electrode active material becomes more prone to microcracks during cycling, leading to the structural damage or even collapse of the positive electrode active material. Especially in the later stage of cycling, the cumulative damage to the positive electrode active material increases, deteriorating the cycling performance.

In view of the above problems, the embodiments of this application propose a lithium-ion battery. The positive electrode active material of the lithium-ion battery includes a compound with a molecular formula $Li_dNi_aCo_bMn_cM_{(1-a-b-c)}Y_z$, where $0<d\leq2.1$, $0.6<a<1$, $0<b<1$, $0<c<1$, $0.6<a+b+c\leq1$, and $1.8\leq z\leq 3.5$; element M includes at least one of elements B, Mg, Al, Si, P, S, Ca, Sc, Ti, V, Cr, Fe, Cu, Zn, Sr, Y, Zr, Nb, Mo, Cd, Sn, Sb, Te, Ba, Ta, W, Yb, La, and Ce; and element Y includes at least one of elements O and F. The positive electrode active material has a high nickel content. To improve the structural stability of the positive electrode active material, the positive electrode active material of the embodiments of this application further includes element M. The introduction of element M can enhance the crystal structure stability of the positive electrode active material, thereby improving the cycling performance of the lithium-ion battery. However, during cycling, there is a risk of dissolution of both metal and non-metal elements in the positive electrode active material. These dissolved metal and non-metal elements can migrate through the electrolyte to the surface of the negative electrode plate, deteriorating the cycle life. The embodiments of this application further employ a high content of lithium hexafluorophosphate, with a mass proportion of lithium hexafluorophosphate $LiPF_6$ relative to the total mass of the electrolyte being 15% to 20%. The high content of lithium hexafluorophosphate can form a protective layer primarily composed of lithium fluoride LiF on the surface of the positive electrode active material, which can mitigate the dissolution of metal and non-metal elements to some extent, thereby further improving the cycling performance of the lithium-ion battery. The following describes the technical solutions of this application in detail.

Lithium-Ion Battery

According to a first aspect, an embodiment of this application proposes a lithium-ion battery. The lithium-ion battery includes an electrolyte and a positive electrode plate. The electrolyte includes lithium salt, the lithium salt includes lithium hexafluorophosphate, and a mass proportion of the lithium hexafluorophosphate relative to a total mass of the electrolyte is 15% to 20%. The positive electrode plate includes a positive electrode current collector and a positive electrode film layer disposed on at least one side of the positive electrode current collector and containing a positive electrode active material. The positive electrode active material includes a compound with a molecular formula $Li_dNi_aCo_bMn_cM_{(1-a-b-c)}Q_z$, where $0<d\leq2.1$, $0.6<a<1$, $0<b<1$, $0<c<1$, $0.6<a+b+c<1$, and $1.8\leq z\leq3.5$; element M includes at least one of elements B, Mg, Al, Si, P, S, Ca, Sc, Ti, V, Cr, Fe, Cu, Zn, Sr, Y, Zr, Nb, Mo, Cd, Sn, Sb, Te, Ba, Ta, W, Yb, La, and Ce; and element Q includes at least one of elements O and F.

The positive electrode active material has a high nickel content. To improve the structural stability of the positive electrode active material or improve other properties of the positive electrode active material that are favorable to the electrical performance, the positive electrode active material of the embodiments of this application further includes element M. The introduction of element M can enhance the crystal structure stability of the positive electrode active material, thereby improving the cycling performance of the lithium-ion battery. However, during cycling, there is a risk of dissolution of both metal and non-metal elements in the positive electrode active material. These dissolved metal and non-metal elements can migrate through the electrolyte to the surface of the negative electrode plate to cause damage to the solid electrolyte interphase (Solid Electrolyte Interphase, SEI) film on the surface of the negative electrode plate, and may precipitate as elemental metal on the surface of the negative electrode plate, thereby deteriorating the cycling performance. The embodiments of this application further employ a high content of lithium hexafluorophosphate, with a mass proportion of lithium hexafluorophosphate $LiPF_6$ relative to the total mass of the electrolyte being 15% to 20%. The high content of lithium hexafluorophosphate can form a protective layer primarily composed of lithium fluoride LiF on the surface of the positive electrode active material, which can mitigate the dissolution of metal and non-metal elements to some extent, thereby further improving the cycling performance of the lithium-ion battery.

When the mass proportion of lithium hexafluorophosphate is less than 15%, the protective performance on the surface of the positive electrode active material is weakened. Therefore, it is necessary to control the mass proportion of lithium hexafluorophosphate to be greater than or equal to 15%. When the mass proportion of lithium hexafluorophosphate is greater than 20%, the viscosity of the electrolyte is significantly increased, which is not conducive to the migration of lithium ions from the bulk phase of the negative electrode active material to the surface; and the migration of lithium ions from the surface of the negative electrode to the surface of the positive electrode is slowed down, which is not conducive to the migration of lithium ions from the surface of the negative electrode active material to the bulk phase of the negative electrode active material, and is not conducive to the improvement of cycling performance. Therefore, it is necessary to control the mass proportion of lithium hexafluorophosphate to be less than or equal to 20%. For example, the mass proportion of lithium hexafluorophosphate relative to the total mass of the electrolyte may be 15%, 15.5%, 16%, 16.5%, 17%, 17.5%, 18%, 18.5%, 19%, 19.5%, 20%, or in a range defined by any two of these values.

[Positive Electrode Plate]

In some embodiments, the positive electrode plate includes a positive electrode current collector and a positive electrode film layer disposed on at least one side of the positive electrode current collector and containing a positive electrode active material. For example, the positive electrode current collector has two opposite surfaces in its thickness direction, and the positive electrode film layer is disposed on either or both of the two opposite surfaces of the positive electrode current collector.

The positive electrode active material includes a compound with a molecular formula $Li_dNi_aCo_bMn_cM_{(1-a-b-c)}Q_z$, where $0<d\leq2.1$, $0.6<a<1$, $0<b<1$, $0<c<1$, $0.6<a+b+c<1$, and $1.8\leq z\leq3.5$. Element M includes at least one of elements B, Mg, Al, Si, P, S, Ca, Sc, Ti, V, Cr, Fe, Cu, Zn, Sr, Y, Zr, Nb, Mo, Cd, Sn, Sb, Te, Ba, Ta, W, Yb, La, and Ce. Element Q includes at least one of elements O and F.

In addition to including element lithium, the positive electrode active material also includes element nickel, element cobalt, element manganese, and element M. Element nickel can enhance the gram capacity of the positive electrode active material, element cobalt can stabilize the crystal structure of the positive electrode active material, element manganese can enhance the overall structural stability of the positive electrode active material, and element M can improve the crystal structure stability of the positive electrode active material.

In some embodiments, d may be 0.01, 0.02, 0.05, 0.08, 0.10, 0.12, 0.15, 0.18, 0.20, 0.22, 0.25, 0.28, 0.30, 0.32, 0.35, 0.38, 0.40, 0.42, 0.45, 0.48, 0.50, 0.52, 0.55, 0.58, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, 1, 1.1, 1.2, 1.3, 1.4, 1.5, 1.6, 1.7, 1.8, 1.9, 2.0, 2.1, or in a range defined by any two of these values.

In some embodiments, a may be 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or in a range defined by any two of these values.

In some embodiments, b may be 0.01, 0.02, 0.05, 0.08, 0.10, 0.12, 0.15, 0.18, 0.20, 0.22, 0.25, 0.28, 0.30, 0.32, 0.35, 0.38, 0.40, 0.42, 0.45, 0.48, 0.50, 0.52, 0.55, 0.58, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or in a range defined by any two of these values.

In some embodiments, c may be 0.01, 0.02, 0.05, 0.08, 0.10, 0.12, 0.15, 0.18, 0.20, 0.22, 0.25, 0.28, 0.30, 0.32, 0.35, 0.38, 0.40, 0.42, 0.45, 0.48, 0.50, 0.52, 0.55, 0.58, 0.60, 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or in a range defined by any two of these values.

In some embodiments, a+b+c may be 0.61, 0.62, 0.63, 0.64, 0.65, 0.66, 0.67, 0.68, 0.69, 0.70, 0.71, 0.72, 0.73, 0.74, 0.75, 0.76, 0.77, 0.78, 0.79, 0.80, 0.81, 0.82, 0.83, 0.84, 0.85, 0.86, 0.87, 0.88, 0.89, 0.90, 0.91, 0.92, 0.93, 0.94, 0.95, 0.96, 0.97, 0.98, 0.99, or in a range defined by any two of these values.

In some embodiments, z may be 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, or in a range defined by any two of these values.

During the charge and discharge processes of the lithium-ion battery, active ions such as Li are intercalated, deintercalated, and consumed, and the molar percentage of Li varies at different states of discharge. In the enumeration of the positive electrode active material in the embodiments of this application, the molar percentage of Li is the initial state of the material, that is, the state before feeding. When the positive electrode active material is applied to the battery system, the molar percentage of Li in the positive electrode active material may change after charge and discharge cycles.

In the enumeration of the positive electrode active material in the embodiments of this application, the molar percentage of oxygen O is only a theoretical value. Lattice oxygen release can lead to changes in the molar percentage of oxygen O, and in practice, the molar percentage of oxygen O may fluctuate.

In some embodiments, element M includes at least one of elements Ti and Zr; and optionally, M includes elements Ti and Zr. Both Ti and Zr can play a role in stabilizing the structure of the positive electrode active material, thereby enhancing the cycling performance. Particularly, when M includes both elements Ti and Zr, the combined use of the two elements can further stabilize the material structure and improve the cycling performance.

In some embodiments, based on the total mass of the positive electrode active material, a total mass proportion of elements Ti and Zr is 1600 ppm to 3150 ppm. When the addition amount of elements Ti and Zr is within the above range, the crystal structure of the positive electrode active material can be further enhanced, improving the cycling performance.

The total mass proportion of elements Ti and Zr refers to a ratio of the total mass of elements Ti and Zr to the total mass of the positive electrode active material.

For example, the total mass proportion of elements Ti and Zr may be 1600 ppm, 1700 ppm, 1800 ppm, 1900 ppm, 2000 ppm, 2100 ppm, 2200 ppm, 2300 ppm, 2400 ppm, 2500 ppm, 2600 ppm, 2700 ppm, 2800 ppm, 2900 ppm, 3000 ppm, 3100 ppm, 3150 ppm, or in a range defined by any two of these values.

In some embodiments of this application, based on the total mass of the positive electrode active material, the mass proportion of element Ti is 100 ppm to 600 ppm, for example, may be 100 ppm, 200 ppm, 300 ppm, 400 ppm, 450 ppm, 500 ppm, 600 ppm, or in a range defined by any two of these values.

In some embodiments of this application, based on the total mass of the positive electrode active material, the mass proportion of element Zr is 500 ppm to 2550 ppm, optionally 1500 ppm to 2550 ppm, for example, may be 500 ppm, 600 ppm, 700 ppm, 800 ppm, 900 ppm, 1000 ppm, 1100 ppm, 1200 ppm, 1300 ppm, 1400 ppm, 1500 ppm, 1600 ppm, 1700 ppm, 1800 ppm, 1900 ppm, 2000 ppm, 2100 ppm, 2200 ppm, 2300 ppm, 2400 ppm, 2500 ppm, 2550 ppm, or in a range defined by any two of these values.

In some embodiments, the electrolyte includes a first additive, where the first additive includes at least one of lithium difluoroxalate borate LiDFOB and lithium tetrafluoroborate $LiBF_4$. In the later stage of cycling of the lithium-ion battery, metal ions such as Ti and Zr ions in the positive electrode active material are at risk of dissolving into the electrolyte and migrating to the surface of the negative electrode plate. The first additive contains fluoride ions and boron ions, and the fluoride ions and boron ions have a strong ability of binding with the above metal ions, reducing the risk of metal ions migrating to the surface of the negative electrode plate, thereby improving the cycling performance of the lithium-ion battery. Additionally, although Ti and Zr ions can improve the structural stability of the material, they may adversely affect the conduction of lithium ions within the lattice, leading to power degradation. The first additive can also compensate for the power degradation caused by Ti and Zr ions.

In some embodiments, the positive electrode active material includes single crystal particles, where the single crystal particle includes an inner region and an outer region, where the outer region is a region extending 500 nm directly from any point on an outer surface of the single crystal particle toward inside of the single crystal particle; and element M includes element aluminum Al, where elements aluminum Al are distributed at least in the outer region.

The inner region of the single crystal particle can be understood as the core of the single crystal particle, with the outer region coating the inner region. There may be no clear boundary between the outer region and the inner region. The outer region and the inner region can be considered as two artificially defined regions. The outer region is a region extending 500 nm from any point on an outer surface of the single crystal particle toward inside of the single crystal particle, with the extension path being a straight path. The outer region can be understood as a ring structure, where a radial spacing of the ring structure is less than or equal to 500 nm.

The distribution of element aluminum Al at least in the outer region helps to form aluminum oxide $Al_2O_3$ in the positive electrode active material, which can passivate side reactions between the positive electrode active material and the electrolyte, further enhancing the structural stability of the positive electrode active material and improving the cycling performance of the lithium-ion battery. Certainly, in addition to being distributed in the outer region, element Al can be further distributed in the inner region.

In some embodiments, based on the total mass of the positive electrode active material, a mass proportion of element Al is 500 ppm to 3000 ppm, optionally 1000 ppm to 2000 ppm.

For example, the mass proportion of element Al may be 500 ppm, 600 ppm, 700 ppm, 800 ppm, 900 ppm, 1000 ppm, 1100 ppm, 1200 ppm, 1300 ppm, 1400 ppm, 1500 ppm, 1600 ppm, 1700 ppm, 1800 ppm, 1900 ppm, 2000 ppm, or in a range defined by any two of these values.

In some embodiments, the electrolyte includes a second additive, where the second additive lithium includes difluorophosphate $LiPO_2F_2$. Lithium difluorophosphate $LiPO_2F_2$, combined with the element Al in the positive electrode active material, can reduce the DCR on the surface of the positive electrode active material and enhance the interface power.

In some embodiments, element M further includes at least one of elements phosphorus P, sulfur S, and boron B, where at least one of elements P, S, and B is distributed in the outer region.

Optionally, element M includes elements phosphorus P, sulfur S, and boron B. Elements phosphorus P, sulfur S, and boron B can embed in the oxygen layer, playing a role in stabilizing lithium, thereby enhancing the structural stability of the positive electrode active material and improving the cycling performance of the lithium-ion battery.

In some embodiments, based on the total mass of the positive electrode active material, a total mass proportion of elements P, S, and B is 0 ppm to 800 ppm, optionally 10 ppm to 500 ppm, for example, 0, 10 ppm, 20 ppm, 30 ppm, 40 ppm, 50 ppm, 60 ppm, 80 ppm, 100 ppm, 150 ppm, 200 ppm, 250 ppm, 300 ppm, 350 ppm, 400 ppm, 450 ppm, 500 ppm, 600 ppm, 700 ppm, 800 ppm, or in a range defined by any two of these values. When the total mass proportion of elements P, S, and B is 0, it means that no such elements are added.

In some embodiments of this application, based on the total mass of the positive electrode active material, the total mass proportion of element P is 10 ppm to 500 ppm, for example, 10 ppm, 20 ppm, 30 ppm, 40 ppm, 50 ppm, 60 ppm, 80 ppm, 100 ppm, 150 ppm, 200 ppm, 250 ppm, 300 ppm, 350 ppm, 400 ppm, 450 ppm, 500 ppm, or in a range defined by any two of these values.

In some embodiments of this application, based on the total mass of the positive electrode active material, the total mass proportion of element S is 10 ppm to 500 ppm, for example, 10 ppm, 20 ppm, 30 ppm, 40 ppm, 50 ppm, 60 ppm, 80 ppm, 100 ppm, 150 ppm, 200 ppm, 250 ppm, 300 ppm, 350 ppm, 400 ppm, 450 ppm, 500 ppm, or in a range defined by any two of these values.

In some embodiments of this application, based on the total mass of the positive electrode active material, the total mass proportion of element B is 10 ppm to 500 ppm, for example, 10 ppm, 20 ppm, 30 ppm, 40 ppm, 50 ppm, 60 ppm, 80 ppm, 100 ppm, 150 ppm, 200 ppm, 250 ppm, 300 ppm, 350 ppm, 400 ppm, 450 ppm, 500 ppm, or in a range defined by any two of these values.

In some embodiments, the electrolyte includes a third additive. The third additive includes lithium fluorosulfonate and can form a low-impedance film component on the surface of the positive electrode active material. The third additive, combined with the elements phosphorus P, sulfur S, and boron B in the positive electrode active material, can reduce the DCR on the surface of the positive electrode active material and enhance the interface power.

In the embodiments of this application, the proportion of elements in the positive electrode active material is known in the art and can be tested using the equipment and methods known in the art, for example, determined through inductively coupled plasma atomic emission (ICP-OES, instrument model: Thermo ICAP7400) with reference to EPA 6010D-2014 Inductively Coupled Plasma Atomic Emission Spectrometry. First, 0.4 g of the positive electrode active material is weighed, added with 10 ml of aqua regia (with a concentration of 50%), and placed on a 180° C. plate for 30 minutes. After digestion on the plate, the resulting sample is diluted to a volume of 100 mL, and quantitative testing is performed using the standard curve method.

In some embodiments, the positive electrode film layer further optionally includes a positive electrode conductive agent. The positive electrode conductive agent is not limited to a particular type in the embodiments of this application. For example, the positive electrode conductive agent includes at least one of superconducting carbon, conductive graphite, acetylene black, carbon black, Ketjen black, carbon dots, carbon nanotubes, graphene, and carbon nanofiber. In some embodiments, based on a total mass of the positive electrode film layer, a mass proportion of the positive electrode conductive agent is ≤5%.

In some embodiments, the positive electrode film layer further optionally includes a positive electrode binder. The positive electrode binder is not limited to a particular type in the embodiments of this application. For example, the positive electrode binder may include at least one of polyvinylidene fluoride (PVDF), polytetrafluoroethylene (PTFE), vinylidene fluoride-tetrafluoroethylene-propylene terpolymer, vinylidene fluoride-hexafluoropropylene-tetrafluoroethylene terpolymer, tetrafluoroethylene-hexafluoropropylene copolymer, and fluorine-containing acrylic resin. In some embodiments, based on the total mass of the positive electrode film layer, a mass proportion of the positive electrode binder is ≤5%.

In some embodiments, a ratio of a press density of the positive electrode film layer to a press density of the negative electrode film layer is (2-2.5):1. for example, 2:1, 2.1:1, 2.2:1, 2.3:1, 2.4:1, 2.5:1, or in a range defined by any two of these values.

In some embodiments, the press density of the positive electrode film layer is 3.0 $g/cm^3$ to 3.5 $g/cm^3$, optionally 3.2 $g/cm^3$ to 3.5 $g/cm^3$, for example, 3 $g/cm^3$, 3.1 $g/cm^3$, 3.2 $g/cm^3$, 3.3 $g/cm^3$, 3.35 $g/cm^3$, 3.4 $g/cm^3$, 3.5 $g/cm^3$, or in a range defined by any two of these values.

In the embodiments of this application, the press density of the positive electrode active material layer has a meaning known in the art, and can be tested using a method known in the art. For example, a single-side coated and cold-pressed positive electrode plate (if a double-side coated positive electrode plate is used, a positive electrode membrane on one side may be wiped off first) is taken and punched into a small disc with an area of S1. The small disc is weighed, and the weight is recorded as M1. Then the positive electrode membrane of the weighed positive electrode plate is wiped off, the positive electrode current collector is weighed, and its weight is recorded as M0. Surface density of the positive electrode active material layer=(weight M1 of the positive electrode plate—weight M0 of the positive electrode current collector)/S1. Press density of the positive electrode active material layer=surface density of the positive electrode active material layer/thickness of the positive electrode active material layer.

In some embodiments, the positive electrode current collector may be a metal foil current collector or a composite current collector. An aluminum foil may be used as an example of the metal foil. The composite current collector may include a polymer material matrix and a metal material layer formed on at least one surface of the polymer material matrix. For example, a metal material of a metal material layer may include at least one of aluminum, aluminum alloy, nickel, nickel alloy, titanium, titanium alloy, silver, and silver alloy. For example, the polymer material matrix may include at least one of polypropylene (PP), polyethylene terephthalate (PET), polybutylene terephthalate (PBT), polystyrene (PS), and polyethylene (PE).

In some embodiments, a thickness of the positive electrode current collector is less than or equal to 10 μm, optionally 8 μm to 10 μm.

The relatively small thickness of the positive electrode current collector can weaken the heat dissipation channel of the lithium-ion battery. In a low-SOC discharge state, the lithium-ion battery can retain some heat, which is conducive to reducing the DCR at a low SOC, thereby improving the discharge power at the low SOC.

For example, the thickness of the positive electrode current collector may be 8 μm, 8.2 μm, 8.5 μm, 8.8 μm, 9.0 μm, 9.2 μm, 9.5 μm, 9.6 μm, 9.8 μm, 10 μm, or in a range defined by any two of these values.

In the embodiments of this application, the thickness of the positive electrode current collector has a meaning known in the art and can be tested using the equipment and methods known in the art. For example, the positive electrode plate is used as a sample, then the positive electrode film layer on the surface of the positive electrode plate is washed off with an organic solvent such as alcohol, and the thickness of the positive electrode current collector is measured with a micrometer.

The positive electrode film layer is typically formed by applying a positive electrode slurry onto the positive electrode current collector and performing drying and cold pressing. The positive electrode slurry is typically formed by dispersing the positive electrode active material, the optional conductive agent, the optional binder, and any other components in a solvent and stirring them to uniformity. The solvent may be N-methylpyrrolidone (NMP), but is not limited thereto.

[Electrolyte]

Organic Solvent

In some embodiments, the electrolyte includes an organic solvent.

In some embodiments, the organic solvent may include cyclic carbonate, and based on the total mass of the electrolyte, a ratio of a mass proportion of the cyclic carbonate to the mass proportion of the lithium hexafluorophosphate is (0.60-2.50):1, optionally (1.00-1.65):1.

The presumed beneficial effect is as follows: The ratio of the mass proportion of the cyclic carbonate to the mass proportion of the lithium hexafluorophosphate being within the above range is conducive to fully dissociating more lithium ions from the lithium hexafluorophosphate, so that even at the end stage of low-SOC discharge, the electrolyte system can still contain a large number of lithium ions, and lithium ions are allowed to be continuously dissociated as the battery reaction proceeds, thereby improving the power performance of the battery.

For example, based on the total mass of the electrolyte, the ratio of the mass proportion of the cyclic carbonate to the mass proportion of the lithium hexafluorophosphate may be 0.6:1, 0.7:1, 0.8:1, 0.9:1, 1.0:1, 1.1:1, 1.15:1, 1.2:1, 1.25:1, 1.3:1, 1.35:1, 1.37:1, 1.4:1, 1.5:1, 1.6:1, 1.65:1, 1.67:1, 1.7:1, 1.8:1, 1.9:1, 2:1, 2.1:1, 2.2:1, or in a range defined by any two of these values.

In some embodiments, based on the total mass of the electrolyte, the mass proportion of the cyclic carbonate is 10% to 45%, further optionally 20% to 30%. The cyclic carbonate has a high dielectric constant and high ionic conductivity, allowing stable SEI films to be formed on the surface of the negative electrode active material.

For example, based on the total mass of the electrolyte, the mass proportion of the cyclic carbonate may be 10%, 10.92%, 11%, 12%, 13%, 14%, 15%, 16%, 17%, 18%, 19%, 20%, 20.93%, 21%, 22%, 23%, 23.66%, 24%, 25%, 26%, 27%, 28%, 29%, 29.12%, 30%, 30.03%, 31%, 32%, 33%, 34%, 35%, 36%, 36.4%, 37%, 38%, 39%, 40%, 40.4%, 41%, 42%, 43%, 44%, 45%, or in a range defined by any two of these values.

In some embodiments, the cyclic carbonate may include at least one of ethylene carbonate EC, propylene carbonate PC, and butylene carbonate BC.

In some embodiments, the organic solvent may include linear carbonate, and based on the total mass of the electrolyte, a ratio of a mass proportion of the linear carbonate to the mass proportion of the cyclic carbonate is (0.9-6):1, optionally (1.5-2.65):1. When the ratio of the mass proportion of the linear carbonate to the mass proportion of the cyclic carbonate satisfies the above range, both the viscosity and ionic conductivity of the electrolyte can be improved, enhancing the kinetic performance of lithium ions.

For example, the ratio of the mass proportion of the linear carbonate to the mass proportion of the cyclic carbonate may be 0.9:1, 1.0:1, 1.1:1, 1.2:1, 1.3:1, 1.37:1, 1.4:1, 1.5:1, 1.6:1, 1.65:1, 1.67:1, 1.7:1, 1.8:1, 1.9:1, 2.0:1, 2.1:1, 2.2:1, 2.3:1, 2.4:1, 2.5:1, 2.6:1, 2.7:1, 2.8:1, 2.9:1, 3.0:1, 3.1:1, 3.2:1, 3.3:1, 3.4:1, 3.5:1, 3.6:1, 3.7:1, 3.8:1, 3.9:1, 4.0:1, 4.1:1, 4.2:1, 4.3:1, 4.4:1, 4.5:1, 4.6:1, 4.7:1, 4.8:1, 4.9:1, 5.0:1, 5.1:1, 5.2:1, 5.3:1, 5.4:1, 5.5:1, 5.6:1, 5.7:1, 5.8:1, 5.9:1, 5.95:1, 6:1, or in a range defined by any two of these values.

In some embodiments, based on the total mass of the electrolyte, the mass proportion of the linear carbonate is 35% to 75%, further optionally 50% to 75%. Linear carbonate has a relatively low viscosity, which is conducive to the rapid migration of lithium ions and facilitates better electrochemical stability, improving the low-temperature performance of the electrolyte.

For example, based on the total mass of the electrolyte, the mass proportion of the linear carbonate may be 35%, 36%, 37%, 38%, 39%, 40%, 41%, 42%, 43%, 44%, 45%, 46%, 47%, 48%, 49%, 50%, 50.4%, 51%, 52%, 52.5%, 53%, 54%, 55%, 56%, 57%, 58%, 59%, 60%, 61%, 62%, 63%, 64%, 65%, 68%, 70%, 71%, 72%, 73%, 74%, 75%, or in a range defined by any two of these values.

In some embodiments, the linear carbonate includes at least one of ethyl methyl carbonate EMC, diethyl carbonate DEC, and dimethyl carbonate DMC.

Additive

In some embodiments, the electrolyte may further include an additive.

In some embodiments, the additive includes a first additive, where the first additive includes at least one of lithium difluoroxalate borate LiDFOB and lithium tetrafluoroborate $LiBF_4$. In the later stage of cycling of the lithium-ion battery, metal ions such as Ti and Zr ions in the positive electrode active material are at risk of dissolving into the electrolyte and migrating to the surface of the negative electrode plate. The first additive contains fluoride ions and boron ions, and the fluoride ions and boron ions have a strong ability of binding with the above metal ions, reducing the risk of metal ions migrating to the surface of the negative electrode plate, thereby improving the cycling performance of the lithium-ion battery. The first additive can also compensate for the power degradation caused by Ti and Zr ions.

In some embodiments, based on the total mass of the electrolyte, a mass proportion of the first additive is 30 ppm to 1200 ppm, optionally 100 ppm to 400 ppm. With a mass proportion of Ti being 100 ppm to 600 ppm and a mass proportion of element Zr being 500 ppm to 2550 ppm, the first additive can enhance the ability of binding with Ti and Zr ions, further improving the cycling performance of the lithium-ion battery.

For example, the mass proportion of the first additive may be 30 ppm, 35 ppm, 40 ppm, 45 ppm, 50 ppm, 60 ppm, 70 ppm, 80 ppm, 90 ppm, 100 ppm, 110 ppm, 120 ppm, 130 ppm, 140 ppm, 150 ppm, 160 ppm, 170 ppm, 180 ppm, 190 ppm, 200 ppm, 210 ppm, 220 ppm, 230 ppm, 240 ppm, 250 ppm, 260 ppm, 270 ppm, 280 ppm, 290 ppm, 300 ppm, 310 ppm, 320 ppm, 330 ppm, 340 ppm, 350 ppm, 360 ppm, 370 ppm, 380 ppm, 390 ppm, 400 ppm, 410 ppm, 420 ppm, 430 ppm, 440 ppm, 450 ppm, 460 ppm, 470 ppm, 480 ppm, 490 ppm, 500 ppm, 600 ppm, 700 ppm, 800 ppm, 900 ppm, 1000 ppm, 1100 ppm, 1200 ppm, or in a range defined by any two of these values.

In some embodiments, the additive includes a second additive, where the second additive includes lithium difluorophosphate $LiPO_2F_2$. Lithium difluorophosphate $LiPO_2F_2$ can form a film layer rich in inorganic components on the surface of the positive electrode active material, helping to enhance the ionic and electronic conductivity of the film layer. The film layer formed has a low interface ion impedance, facilitating lithium ion transport and reducing the DCR at a low SOC. Especially, lithium difluorophosphate, combined with the element Al in the positive electrode active material, can reduce the DCR on the surface of the positive electrode active material and enhance the interface power.

In some embodiments, based on the total mass of the electrolyte, a mass proportion of the second additive is 100 ppm to 3000 ppm, optionally 1000 ppm to 2000 ppm. The second additive with the above mass proportion, combined with element Al of 500 ppm to 3000 ppm, can better reduce the DCR on the surface of the positive electrode active material and enhance the interface power.

For example, the mass proportion of the second additive may be 100 ppm, 150 ppm, 200 ppm, 250 ppm, 300 ppm, 350 ppm, 400 ppm, 450 ppm, 500 ppm, 600 ppm, 700 ppm, 800 ppm, 900 ppm, 1000 ppm, 1100 ppm, 1200 ppm, 1300 ppm, 1400 ppm, 1500 ppm, 1600 ppm, 1700 ppm, 1800 ppm, 1900 ppm, 2000 ppm, 2100 ppm, 2200 ppm, 2300 ppm, 2400 ppm, 2500 ppm, 2600 ppm, 2700 ppm, 2800 ppm, 2900 ppm, 3000 ppm, or in a range defined by any two of these values.

In some embodiments, the additive includes a third additive, and the third additive includes lithium fluorosulfonate. The third additive can form a film layer rich in inorganic components on the surface of the positive electrode active material, enhancing the ionic and electronic conductivity of the film layer. The film layer formed has a low interface ion impedance, facilitating lithium ion transport and reducing the DCR at a low SOC. Especially, lithium difluorophosphate, combined with the elements phosphorus P, sulfur S, and boron B in the positive electrode active material, can reduce the DCR on the surface of the positive electrode active material and enhance the interface power.

For example, lithium fluorosulfonate may include at least one of lithium trifluoromethanesulfonate and lithium perfluorohexanesulfonate.

In some embodiments, based on the total mass of the electrolyte, a mass proportion of the third additive is 50 ppm to 200 ppm. The third additive of the above mass proportion, combined with the elements phosphorus P, sulfur S, and boron B of 10 ppm to 800 ppm, can better reduce the DCR on the surface of the positive electrode active material and enhance the interface power.

For example, the mass proportion of the third additive may be 50 ppm, 60 ppm, 70 ppm, 80 ppm, 90 ppm, 100 ppm, 200 ppm, or in a range defined by any two of these values.

In some embodiments, the additive further includes a fourth additive, and the fourth additive may further include at least one of 1,3-propane sultone PS, vinylene carbonate VC, and lithium fluorosulfonate $LiSO_3F$.

In some embodiments, based on the total mass of the electrolyte, a ratio of a mass proportion of 1,3-propane sultone PS, a mass proportion of vinylene carbonate VC, and a mass proportion of lithium fluorosulfonate $LiSO_3F$ is (0.050-0.300):(0.100-0.500):(0.001-0.300). The mass proportion of one of the components in the additive is 0, indicating that no such component is added to the electrolyte. When the ratio of the mass proportion of 1,3-propane sultone PS, the mass proportion of vinylene carbonate VC, and the mass proportion of lithium fluorosulfonate $LiSO_3F$ is within the above range, the above components can participate in forming the SEI film on the surface of the negative electrode active material, allowing the SEI film to effectively alleviate the swelling of the silicon-based material.

In some embodiments, based on the total mass of the electrolyte, the mass proportion of 1,3-propane sultone PS is 0.1% to 1%, for example, 0.1%, 0.2%, 0.3%, 0.4%, 0.5%, 0.6%, 0.7%, 0.8%, 0.9%, 1.0%, or in a range defined by any two of these values.

In some embodiments, based on the total mass of the electrolyte, the mass proportion of vinylene carbonate VC is 0.1% to 1%, for example, 0.1%, 0.2%, 0.3%, 0.4%, 0.5%, 0.6%, 0.7%, 0.8%, 0.9%, 1.0%, or in a range defined by any two of these values.

In some embodiments, based on the total mass of the electrolyte, the mass proportion of lithium fluorosulfonate $LiSO_3F$ is 0.1% to 1%, for example, 0.1%, 0.2%, 0.3%, 0.4%, 0.5%, 0.6%, 0.7%, 0.8%, 0.9%, 1.0%, or in a range defined by any two of these values.

In some embodiments, the additive may include fluorinated cyclic carbonate. Fluorinated cyclic carbonate can participate in forming the SEI film on the surface of the negative electrode active material, effectively protecting the negative electrode active material. Moreover, fluorinated cyclic carbonate has a certain desolvation ability, which is conducive to the migration of lithium ions, reducing the DCR at a low SOC and enhancing the discharge power.

In some embodiments, the fluorinated cyclic carbonate includes at least one of monofluoroethylene carbonate FEC, difluoroethylene carbonate DFEC, and trifluoropropylene carbonate TFPC; and optionally, the fluorinated cyclic carbonate includes monofluoroethylene carbonate FEC. FEC contains a relatively small number of fluorine atoms and has higher polarity, allowing fluorine to be more easily released to participate in the SEI film-forming reaction.

In some embodiments, a ratio of a mass proportion of the fluorinated cyclic carbonate relative to the total mass of the electrolyte to the mass proportion of the element silicon is (0.5-9.5):1, optionally (1-2):1. For example, the ratio of the mass proportion of the fluorinated cyclic carbonate relative to the total mass of the electrolyte to the mass proportion of the element silicon may be 0.5:1, 0.6:1, 0.7:1, 0.8:1, 0.9:1, 1:1, 1.05:1, 1.1:1, 1.2:1, 1.3:1, 1.35:1, 1.4:1, 1.5:1, 1.57:1, 1.6:1, 1.7:1, 1.8:1, 1.9:1, 2:1, 2.1:1, 2.2:1, 2.3:1, 2.36:1, 2.5:1, 3:1, 3.5:1, 4:1, 4.5:1, 4.7:1, 4.71:1, 4.8:1, 5:1, 5.5:1, 5.8:1, 6:1, 6.5:1, 7:1, 7.5:1, 7.8:1, 8:1, 8.5:1, 9:1, 9.1:1, 9.2:1, 9.3:1, 9.4:1, 9.43:1, 9.5:1, or in a range defined by any two of these values.

Fluorinated cyclic carbonate can participate in forming the SEI film on the surface of the negative electrode active material, improving the composition and properties of the film, and effectively protecting the negative electrode active material. Especially in a case of the negative electrode containing silicon, due to the expansion characteristics of silicon, it is more necessary to optimize the composition of the SEI film. The optimization of the film composition is controlled by adjusting the relative proportion of the film-forming additive in the electrolyte. The film formed with the participation of fluorinated cyclic carbonate can improve the flexibility of the SEI film, alleviating the structural collapse caused by the rapid release of a large number of lithium ions from silicon at the end stage of discharge. Moreover, fluorinated cyclic carbonate has a certain desolvation ability, which is conducive to the migration of lithium ions, reducing the DCR at a low SOC and enhancing the discharge power. Research has found that when the content ratio of silicon in the negative electrode active material to FEC in the electrolyte satisfies (0.5-9.5):1, the rate performance of the battery at the end stage of discharge is significantly improved.

In some embodiments, the mass proportion of the fluorinated cyclic carbonate relative to the total mass of the electrolyte may be 0.95% to 5.8%, optionally 1.5% to 3%, for example, 0.95%, 0.98%, 1%, 1.1%, 1.2%, 1.3%, 1.4%, 1.5%, 1.6%, 1.7%, 1.8%, 1.9%, 1.91%, 2.0%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.82%, 3.9%, 4%, 4.1%, 4.5%, 5%, 5.2%, 5.5%, 5.7%, 5.73%, 5.8%, or in a range defined by any two of these values.

Lithium Salt

After the lithium salt is dissolved in the organic solvent, a large number of active lithium ions can be released, participating in charge and discharge.

In some embodiments, based on the total mass of the electrolyte, a ratio of the mass proportion of the fluorinated cyclic carbonate to a mass proportion of the lithium salt is (0.05-0.30):1, optionally (0.10-0.20):1. Fluorinated cyclic carbonate can form organics on the surface of the silicon-based material, improving the flexibility of the SEI film. Lithium salt can participate in forming the SEI film, so that the SEI film contains inorganic components, helping to enhance the ionic and electronic conductivity of the SEI film, thereby improving the overall ionic and electronic conductivity of the negative electrode plate. When the ratio of the mass proportion of the fluorinated cyclic carbonate to the mass proportion of the lithium salt is within the above range, both the flexibility and ionic and electronic conductivity of the SEI film can be improved, and the DCR can also be reduced, thereby enhancing the discharge power of the lithium-ion battery.

For example, the ratio of the mass proportion of the fluorinated cyclic carbonate to the mass proportion of the lithium salt may be 0.05:1, 0.06:1, 0.07:1, 0.08:1, 0.09:1, 0.10:1, 0.11:1, 0.12:1, 0.13:1, 0.14:1, 0.15:1, 0.16:1, 0.17:1, 0.18:1, 0.19:1, 0.20:1, 0.21:1, 0.22:1, 0.23:1, 0.24:1, 0.25:1, 0.26:1, 0.27:1, 0.28:1, 0.29:1, 0.30:1, or in a range defined by any two of these values.

In some embodiments, the lithium salt further includes at least one of inorganic phosphate and inorganic borate; and optionally, the lithium salt includes fluorine-containing inorganic borate. Inorganic phosphate and inorganic borate can participate in forming inorganic components in the SEI film, which is conducive to improving the ionic conductivity and electron conductivity of the SEI film. Moreover, the formed SEI film has a low interfacial ionic impedance, which facilitates the transmission of lithium ions, and can reduce the DCR at a low SOC.

In some embodiments, the inorganic phosphate includes at least one of lithium monofluorophosphate $Li_2PO_3F$ and lithium difluorophosphate $LiPO_2F_2$; and optionally, the inorganic phosphate includes lithium difluorophosphate $LiPO_2F_2$.

In some embodiments, the inorganic borate includes at least one of lithium tetrafluoroborate $LiBF_4$, lithium difluoroxalate borate LiDFOB, and lithium bisoxalatoborate.

In some embodiments, based on the total mass of the electrolyte, a total mass proportion of the inorganic phosphate and the inorganic borate is greater than or equal to 0.05% and less than or equal to 0.50%, optionally 0.10% to 0.30%.

For example, the total mass proportion of inorganic phosphate and inorganic borate may be 0.05%, 0.06%, 0.08%, 0.1%, 0.15%, 0.18%, 0.2%, 0.22%, 0.25%, 0.28%, 0.3%, 0.32%, 0.35%, 0.38%, 0.4%, 0.42%, 0.45%, 0.48%, 0.5%, or in a range defined by any two of these values.

For example, the lithium salt includes lithium tetrafluoroborate $LiBF_4$, lithium difluoroxalate borate LiDFOB, and lithium bisoxalatoborate.

Optionally, based on the total mass of the electrolyte, a mass proportion of lithium tetrafluoroborate $LiBF_4$ may be 0.01% to 0.2%, for example, 0.01%, 0.02%, 0.05%, 0.08%, 0.1%, 0.15%, 0.2%, or in a range defined by any two of these values.

Optionally, based on the total mass of the electrolyte, a mass proportion of lithium difluoroxalate borate LiDFOB may be 0.01% to 0.1%, for example, 0.01%, 0.02%, 0.05%, 0.08%, 0.1%, or in a range defined by any two of these values.

Optionally, based on the total mass of the electrolyte, a mass proportion of lithium bisoxalatoborate may be 0.01% to 0.5%, for example, 0.01%, 0.02%, 0.05%, 0.08%, 0.1%, 0.15%, 0.2%, 0.25%, 0.3%, 0.35%, 0.4%, 0.45%, 0.5%, or in a range defined by any two of these values.

The qualitative and quantitative analysis of various substances or elements in this application can be performed using appropriate equipment and methods known to those skilled in the art. For relevant testing methods, reference may be made to national and international testing standards, national and international enterprise standards, and so on. Practitioners can also adaptively change some testing steps or instrument parameters from the perspective of testing accuracy to obtain more accurate testing results. A qualitative or quantitative analysis can be performed using one testing method or using several testing methods in combination.

In the embodiments of this application, the types and concentrations of inorganic components/lithium salt in the electrolyte are meanings known in the art and can be tested using the equipment and methods known in the art. For example, the inorganic components/lithium salt concentrations in the electrolyte can be qualitatively or quantitatively analyzed using the ion chromatography analysis method with reference to JY/T020-1996 standard General rules for ion chromatography. In the embodiments of this application, a newly prepared electrolyte is used as a sample, or a battery that has been fully discharged (discharged to a lower cut-off voltage so that the state of charge of the battery is about 0% SOC) is disassembled to obtain the free electrolyte from the battery as a sample, and testing is performed through ion chromatography.

In the embodiments of this application, the types and concentrations of organic components in the electrolyte are meanings known in the art and can be tested using the equipment and methods known in the art. For example, the organic components in the electrolyte can be qualitatively and quantitatively analyzed using gas chromatography with reference to GB/T9722-2006 Chemical reagent—General rules for the gas chromatography. In the embodiments of this application, a newly prepared electrolyte is used as a sample, or a battery that has been fully discharged (discharged to a lower cut-off voltage so that the state of charge of the battery is about 0% SOC) is disassembled to obtain the free electrolyte from the battery as a sample, and testing is performed through gas chromatography.

For another example, the components of a specific additive in the electrolyte are tested through liquid chromatography-nuclear magnetic resonance (NMR). Taking lithium difluorophosphate and lithium hexafluorophosphate as examples, in a nitrogen glove box, a 7 ml glass bottle is prepared, 5 ml of NMR reagent premix solution is added into the glass bottle and left standing at room temperature (20° C.-25° C.) in the nitrogen glove box for 24 hours, to let the electrolyte in the electrode plate and separator diffuse into the NMR reagent premix solution, so as to obtain an NMR test sample. The NMR reagent premix solution includes 100 ml of deuterated acetonitrile with 3 ml of trifluoromethylbenzene CF3ph added. The above NMR reagent premix solution is pre-dried with 4A molecular sieve (15 g of fresh 4A molecular sieve is added to 100 ml of NMR reagent premix solution, followed by drying in a nitrogen glove box at room temperature (20° C.-25° C.) for more than 30 days). Testing is performed using 19F NMR (nuclear magnetic resonance (NMR): Bruker Avance 400HD).

To identify and quantify various species, the following settings are used regarding the flip angle and scan time.

F-NMR pulse sequence: 2gfhigqn.2;
Delay time: 1 second;
Number of scans: 16.

The relative contents of trifluoromethylbenzene and $LiPF_6$ are calculated based on integral intensities of the signal peaks of these two substances in F-NMR, using the formula:

Relative content of $PF_6^- = (I_{PF6}^- \times M_{PF6}^-/6)/(I_{CF3ph} \times M_{CF3ph}/3)$, where I is the corresponding NMR peak area, and M is the corresponding relative molecular mass. Then, the proportion of lithium hexafluorophosphate in the electrolyte is calculated based on the molar ratio of hexafluorophosphate to lithium ions.

The proportion of the electrolyte in the deuterated reagent is calculated based on the proportion of lithium hexafluorophosphate $LiPF_6$.

The relative contents of trifluoromethylbenzene and $PO_2F_2^-$ are calculated based on integral intensities of the signal peaks of these two substances in F-NMR, using the formula:

Relative content of $PO_2F_2^- = (I_{PO2F2} \times M_{PO2F2}/2)/(I_{CF3ph} \times M_{CF3ph}/3)$, where I is the corresponding NMR peak area, and M is the corresponding relative molecular mass. Then, the proportion of lithium difluorophosphate in the electrolyte is calculated based on the molar ratio of difluorophosphate to lithium ions.

In some embodiments, an electrolyte retention coefficient of the lithium-ion battery is 1.0 g/Ah to 2.5 g/Ah, optionally 1.8 g/Ah to 2.2 g/Ah.

The electrolyte retention coefficient of the lithium-ion battery can reflect the retention capacity of the electrolyte. When the electrolyte retention coefficient of the lithium-ion battery is within the above range, the electrolyte can effectively wet the positive electrode plate and the negative electrode plate. Moreover, there is a gap between the negative electrode plate and the separator, providing a space for volume swelling of the silicon-based material, thereby reducing the risk of overall battery swelling.

In some embodiments, an electrolyte retention coefficient of the lithium-ion battery is 1.0 g/Ah to 2.5 g/Ah, optionally 1.8 g/Ah to 2.2 g/Ah.

In some embodiments, the various solutes or solvents in the electrolyte mentioned in this application include substances actively added during the preparation of the electrolyte, as well as substances derived from one or more substances already present in the electrolyte during the preparation process or during the storage or use of the battery containing the electrolyte.

The electrolyte retention coefficient of the lithium-ion battery can reflect the retention capacity of the electrolyte. When the electrolyte retention coefficient of the lithium-ion battery is within the above range, the electrolyte can effectively wet the positive electrode plate and the negative electrode plate. Moreover, there is a gap between the negative electrode plate and the separator, providing a space for volume swelling of the silicon-based material, reducing the risk of swelling of the entire lithium-ion battery.

For example, the electrolyte retention coefficient of the lithium-ion battery may be 1.0 g/Ah, 1.1 g/Ah, 1.2 g/Ah, 1.3 g/Ah, 1.4 g/Ah, 1.5 g/Ah, 1.6 g/Ah, 1.7 g/Ah, 1.8 g/Ah, 1.9 g/Ah, 2.0 g/Ah, 2.1 g/Ah, 2.2 g/Ah, 2.3 g/Ah, 2.4 g/Ah, 2.5 g/Ah, or in a range defined by any two of these values.

In the embodiments of this application, the electrolyte retention coefficient of the lithium-ion battery has a meaning known in the art and can be tested using the equipment and methods known in the art. For example, according to GB/T 31486-2015 "Electrical performance requirements and test methods for traction battery of electric vehicle", at 25° C., the lithium-ion battery is charged to 4.35 V at 1C and then discharged to 2.8 V at 1C, and the released capacity C is obtained as the denominator; the lithium-ion battery is weighed and recorded as M0, and then disassembled to obtain the positive electrode plate, negative electrode plate, separator, and electrolyte, where the free electrolyte is present in the housing/bag; all the above solid components are placed into an oven and baked at 60° C. for more than 4 hours (including but not limited to the positive electrode plate, negative electrode plate, separator, and other mechanical parts of the disassembled lithium-ion battery that contribute to M0), then all the components of the lithium-ion battery are weighed and recorded as M1, and the weight difference between M0 and M1 is used as the numerator. The electrolyte retention coefficient is equal to the capacity C divided by the weight difference between M0 and M1.

[Negative Electrode Plate]

In some embodiments, the lithium-ion battery further includes a negative electrode plate.

The negative electrode plate includes a negative electrode current collector and a negative electrode film layer disposed on at least one surface of the negative electrode current collector and including a negative electrode active material. For example, the negative electrode current collector has two opposite surfaces in its thickness direction, and the negative electrode film layer is disposed on either or both of the two opposite surfaces of the negative electrode current collector.

In some embodiments, the negative electrode film layer includes the negative electrode active material, the negative electrode active material includes element carbon and element silicon, and based on the total mass of the negative electrode active material, a ratio of a mass proportion of the element silicon to a mass proportion of the element carbon is (0.3:99.7) to (3:97).

The negative electrode active material of the lithium-ion battery includes a carbon-based material providing element carbon and a silicon-based material providing element silicon. The carbon-based material providing element carbon may contain element carbon and may also contain element silicon, or certainly may contain only element carbon. The silicon-based material providing element silicon may contain element silicon and may also contain element carbon, or certainly may contain only element silicon. The negative electrode active material includes both the carbon-based material and silicon-based material. Compared to the carbon-based material, the silicon-based material has a higher lithium intercalation and deintercalation voltage plateau, so that even at a low SOC (for example, SOC≤10%), the silicon-based material can still participate in discharge, compensating for the inability of the carbon-based material to continue discharging at a low SOC, reducing the direct current resistance DCR during the discharge process of the battery, and thus improving the power performance during the discharge process of the battery.

The mass proportion of element silicon is controlled to be relatively small for the following reasons: Although the silicon-based material has a higher lithium intercalation and deintercalation potential than the carbon-based material, the silicon-based material undergoes significant volume swelling or shrinkage during charge and discharge, which may lead to defects such as structural collapse, cracking, and pulverization of the negative electrode active material, causing undesirable side reactions inside the battery. Moreover, due to the poor conductivity of the silicon-based material, an excessively high silicon content is not conducive to reducing the DCR. Therefore, under the same conditions, batteries with an excessively high silicon content in the negative electrode active material are inferior to batteries with a lower silicon content in terms of power performance.

The electrolyte in the embodiments of this application also uses 15% to 20% lithium hexafluorophosphate. The synergistic effect of the electrolyte and the negative electrode improves the power performance of the battery at the end stage of discharge.

Lithium hexafluorophosphate can participate in forming the solid electrolyte interphase (Solid Electrolyte Interphase, SEI) film components on the surface of the negative electrode active material. The lithium hexafluorophosphate with a high proportion of fluorine atoms can optimize the SEI film components, and a high mass proportion of lithium hexafluorophosphate has more significant improvement on the SEI film components, increasing the proportion of fluorine-lithium compounds (such as lithium fluoride) in the SEI film. Such SEI film with a high proportion of fluorine-lithium compounds can alleviate the problem of silicon-based material cracking and pulverization, enhancing the overall structural stability of the negative electrode active material; and can also delay the side reactions on the electrolyte and the surface of the negative electrode active material, thereby enhancing the discharge stability of the silicon-based material at the end stage of discharge and further improving the power performance of the battery.

Moreover, at the end stage of low-SOC discharge, the lithium ion concentration in the negative electrode active material is relatively low, and it is more difficult for lithium ions to be deintercalated from the negative electrode active material, reducing the lithium salt concentration difference in the electrolyte system, increasing the internal resistance of the lithium-ion battery, and further reducing the discharge power. In contrast, the electrolyte in the embodiments of this application includes a high content of lithium hexafluorophosphate and can contribute more lithium ions to the battery system, increasing the lithium ion concentration in the electrolyte, effectively reducing the lithium salt concentration polarization, promoting the migration of lithium ions from the negative electrode plate to the positive electrode plate, and further improving the power performance of the lithium-ion battery.

The mass proportion of the element carbon relative to the total mass of the negative electrode active material is greater than or equal to 97% and less than or equal to 99.7%, for example, 97%, 97.2%, 97.5%, 97.6%, 97.8%, 98%, 98.2%, 98.5%, 98.6%, 98.8%, 99%, 99.5%, 99.7%, or in a range defined by any two of these values.

The mass proportion of the element silicon relative to the total mass of the negative electrode active material is 0.3% to 3.0%, for example, 0.3%, 0.32%, 0.4%, 0.5%, 0.6%, 0.64%, 0.7%, 0.8%, 0.9%, 1.0%, 1.1%, 1.2%, 1.27%, 1.3%, 1.4%, 1.5%, 1.6%, 1.7%, 1.8%, 1.9%, 1.91%, 2.0%, 2.1%, 2.2%, 2.23%, 2.3%, 2.4%, 2.5%, 2.6%, 2.7%, 2.8%, 2.86%, 2.9%, 3%, or in a range defined by any two of these values.

As mentioned earlier, element silicon can come from the silicon-based material, where the silicon-based material can be a raw material for forming the negative electrode film layer. In some embodiments, the element silicon in the negative electrode active material exists in the negative electrode film layer in at least one form of elemental silicon, silicon-carbon composite, and silicon oxide $SiOx$ ($0<x\leq2$). The elemental silicon, silicon-carbon composite, and silicon oxide $SiOx$ ($0<x\leq2$) herein can refer to a silicon-based material or a form in which element silicon exists in the negative electrode plate of the battery already subjected to formation. Herein, silicon oxide $SiOx$ ($0<x\leq2$) means that silicon atoms and oxygen atoms in the negative electrode film layer can be combined in various ways, and can be at least one of $SiO$, $SiO_{1.2}$, $SiO_2$, and other possible silicon oxides. The silicon-carbon composite herein may be a silicon-carbon composite generated by some chemical reactions between the elements silicon and carbon in the lithium-ion battery. The silicon oxide has a relatively high voltage plateau, which facilitates deintercalation of lithium ions at a low SOC and contributes capacity to discharge, improving the power performance of the lithium-ion battery.

Element carbon is primarily a component of the carbon-based material. In some embodiments, the carbon-based material may include at least one of artificial graphite and natural graphite. Optionally, the carbon-based material may include natural graphite. Natural graphite generally has a smaller particle size and allows for faster intercalation and deintercalation of lithium ions. Natural graphite usually contains amorphous carbon on its surface, and the amorphous carbon can reduce the DCR and improve the power.

The qualitative and quantitative analysis of various substances or elements in this application can be performed using appropriate equipment and methods known to those skilled in the art. For relevant testing methods, reference may be made to national and international testing standards, national and international enterprise standards, and so on. Practitioners can also adaptively change some testing steps or instrument parameters from the perspective of testing accuracy to obtain more accurate testing results. A qualitative or quantitative analysis can be performed using one testing method or using several testing methods in combination.

For example, taking testing of the element silicon in the negative electrode active material as an example, qualitative and quantitative analysis can be performed with reference to JY/T015-1996 General rules for inductivity coupled plasma-atomic emission spectrometry. Further, elements on the surface of the negative electrode plate or elements on the ion-polished cross section can be performed with reference with the GB-T17359-2012 standard.

For example, for the graphite material in this application, the negative electrode plate or negative electrode active material is tested by X-ray powder diffraction and qualitatively analyzed with reference to JIS/K0131-1996 General rules for X-ray diffractometric analysis. The elemental silicon, silicon-carbon composite, and silicon oxide SiOx ($0<x≤2$) in this application can also be tested by X-ray powder diffraction and qualitatively analyzed.

In some embodiments, based on the total mass of the negative electrode active material, a ratio of a mass proportion of the silicon oxide SiOx (x=1) to a mass proportion of the artificial graphite is (0.5:99.5) to (5:95). When the negative electrode active material satisfies the above range, the discharge power at a low SOC can be further improved.

For example, the ratio of the mass proportion of the silicon oxide SiO to the mass proportion of the artificial graphite may be 0.5:99.5, 1:99, 1.5:98.5, 2:98, 2.5:97.5, 3:97, 3.5:96.5, 4:96, 4.5:95.5, 5:95, or in a range defined by any two of these values.

In some embodiments, the mass proportion of the silicon oxide SiO may be 0.5% to 5%, optionally 2% to 3.5%, for example, 0.5%, 1.0%, 1.1%, 1.2%, 1.3%, 1.4%, 1.5%, 1.6%, 1.7%, 1.8%, 1.9%, 2.0%, 2.1%, 2.2%, 2.3%, 2.4%, 2.5%, 2.6%, 2.7%, 2.8%, 2.9%, 3%, 3.1%, 3.2%, 3.3%, 3.4%, 3.5%, 3.6%, 3.7%, 3.8%, 3.9%, 4.0%, 4.1%, 4.2%, 4.3%, 4.4%, 4.5%, 4.6%, 4.7%, 4.8%, 4.9%, 5.0%, or in a range defined by any two of these values. When the mass proportion of the silicon oxide SiO satisfies the above range, the discharge power at a low SOC can be further improved.

In some embodiments, the mass proportion of the artificial graphite may be 95% to 99.5%, optionally 96.5% to 98%, for example, 95%, 95.1%, 95.2%, 95.3%, 95.4%, 95.5%, 95.6%, 95.7%, 95.8%, 95.9%, 96%, 96.1%, 96.2%, 96.3%, 96.4%, 96.5%, 96.6%, 96.7%, 96.8%, 96.9%, 97%, 97.1%, 97.2%, 97.3%, 97.4%, 97.5%, 97.6%, 97.7%, 97.8%, 97.9%, 98%, 98.1%, 98.2%, 98.3%, 98.4%, 98.5%, 98.6%, 98.7%, 98.8%, 98.9%, 99%, 99.5%, or in a range defined by any two of these values. When the mass proportion of the artificial graphite satisfies the above range, the cycling performance of the battery can be improved.

In some embodiments, based on the total mass of the negative electrode film layer, a mass proportion of the negative electrode active material is greater than or equal to 85% and less than 100%. For example, the mass proportion of the negative electrode active material may be 85%, 86%, 87%, 88%, 89%, 90%, 91%, 92%, 93%, 94%, 95%, 96%, 97%, 98%, 99%, or in a range defined by any two of these values.

In some embodiments, a thickness of the negative electrode film layer on one side is 65 μm to 90 μm. The thickness of the negative electrode film layer is the thickness of the negative electrode film layer on one side. For example, if the negative electrode current collector has negative electrode film layers on both sides, the thickness of the negative electrode film layer on one side of the negative electrode current collector is the thickness of the single-side negative electrode film layer. If the negative electrode current collector has a negative electrode film layer on one side only, the thickness of the negative electrode film layer on that side is the thickness of the single-side negative electrode film layer. When the thickness of the negative electrode film layer is within the above range, the transmission rate of lithium ions in the negative electrode plate is substantially consistent with the transmission rate in the separator, reducing the risk of exacerbating the concentration polarization, and helping to improve the discharge performance.

For example, the thickness of the negative electrode film layer may be 65 μm, 66 μm, 67 μm, 68 μm, 69 μm, 70 μm, 71 μm, 72 μm, 73 μm, 74 μm, 75 μm, 76 μm, 77 μm, 78 μm, 79 μm, 80 μm, 81 μm, 82 μm, 83 μm, 84 μm, 85 μm, 86 μm, 87 μm, 88 μm, 89 μm, 90 μm, or in a range defined by any two of these values.

In the embodiments of this application, the thickness of the negative electrode film layer has a meaning known in the art and can be tested using the equipment and methods known in the art. For relevant testing methods, reference may be made to national and international testing standards, national and international enterprise standards, and so on. Practitioners can also adaptively change some testing steps or instrument parameters from the perspective of testing accuracy to obtain more accurate testing results. A qualitative or quantitative analysis can be performed using one testing method or using several testing methods in combination. For example, according to GB/T 17359-2012 Microbeam analysis—Quantitative analysis using energy dispersive spectrometry, the negative electrode plate without electrolyte can be used as a sample for ion-polished cross-sectional element analysis to obtain the thickness of the negative electrode film layer. For another example, the average value can be taken through multiple measurements using a micrometer: taking a negative electrode plate without electrolyte (a negative electrode plate coated with negative electrode film layers on both sides); first measuring the thickness of the negative electrode plate at any five points with a micrometer and obtaining an average value H1; then wiping off the negative electrode film layers, measuring the thickness at any five points of the current collector, and obtaining an average value H2; and obtaining the thickness of the single-side negative electrode film layer according to (H2-H1)/2. In some embodiments, the press density PD of the negative electrode film layer is 1.3 g/cm$^3$ to 1.7 g/cm$^3$. When the press density of the negative electrode film layer is within this range, the negative electrode plate can have good kinetic performance and cycling performance.

For example, the press density PD of the negative electrode film layer may be 1.3 g/cm$^3$, 1.35 g/cm$^3$, 1.4 g/cm$^3$, 1.45 g/cm$^3$, 1.5 g/cm$^3$, 1.55 g/cm$^3$, 1.6 g/cm$^3$, 1.65 g/cm$^3$, 1.7 g/cm$^3$, or in a range defined by any two of these values.

Surface density=weight of single-side negative electrode film layer/area of single-side negative electrode film layer. Since the negative electrode current collector has negative electrode film layers on both sides, weight of single-side negative electrode film layer=(average weight of electrode plate–average weight of current collector)/2. Press density=surface density/average thickness of negative electrode film layer. Since the negative electrode current collector has negative electrode film layers on both sides, average thickness of negative electrode film layer=(average thickness of electrode plate–average thickness of current collector)/2.

Herein, "average" can be the average value taken after five parallel tests.

In some embodiments, the negative electrode film layer further optionally includes a negative electrode conductive agent. The negative electrode conductive agent is not limited to a particular type in the embodiments of this application.

For example, the negative electrode conductive agent includes at least one of superconducting carbon, conductive graphite, acetylene black, carbon black, Ketjen black, carbon dots, carbon nanotubes, graphene, and carbon nanofiber. In some embodiments, based on the total mass of the negative electrode film layer, a mass proportion of the negative electrode conductive agent is ≤5%.

In some embodiments, the negative electrode film layer further optionally includes a negative electrode binder. The negative electrode binder is not limited to a particular type in the embodiments of this application. For example, the negative electrode binder may include at least one of styrene-butadiene rubber SBR, water-soluble unsaturated resin SR-1B, and water-based acrylic resin (such as polyacrylic acid PAA, polymethacrylic acid PMAA, sodium polyacrylate PAAS, polyacrylamide PAM, polyvinyl alcohol PVA, sodium alginate SA, and carboxymethyl chitosan CMCS). In some embodiments, based on the total mass of the negative electrode film layer, a mass proportion of the negative electrode binder is ≤5%.

In some embodiments, the negative electrode film layer further optionally includes another promoter. For example, the another promoter may include a thickener, for example, sodium carboxymethyl cellulose CMC-Na or a PTC thermistor material. In some embodiments, based on the total mass of the negative electrode film layer, a mass proportion of the another promoter is ≤2%.

In some embodiments, the negative electrode current collector may be a metal foil current collector or a composite current collector. A copper foil may be used as an example of the metal foil. The composite current collector may include a polymer material matrix and a metal material layer formed on at least one surface of the polymer material matrix. For example, a metal material may include at least one of copper, copper alloy, nickel, nickel alloy, titanium, titanium alloy, silver, and silver alloy. For example, the polymer material matrix may include at least one of polypropylene, polyethylene terephthalate, polybutylene terephthalate, polystyrene, and polyethylene.

In some embodiments, a thickness of the negative electrode current collector is less than or equal to 6 µm, and optionally a thin current collector with a thickness of 4.5 µm to 6 µm.

In the embodiments of this application, the negative electrode current collector of the lithium-ion battery is optionally a thin current collector with a thickness of 4.5 µm to 6 µm, thereby weakening the heat dissipation channels of the lithium-ion battery. In a low-SOC discharge state, the battery can retain some heat, further enhancing the beneficial effect of the low-silicon negative electrode plate combined with the electrolyte system containing a high content of lithium hexafluorophosphate on reducing the DCR growth at the end stage of discharge (at a low SOC), thereby improving the discharge power at a low SOC.

For example, the thickness of the negative electrode current collector may be 4.0 µm, 4.1 µm, 4.2 µm, 4.3 µm, 4.4 µm, 4.5 µm, 4.6 µm, 4.7 µm, 4.8 µm, 4.9 µm, 5.0 µm, 5.1 µm, 5.2 µm, 5.3 µm, 5.4 µm, 5.5 µm, 5.6 µm, 5.7 µm, 5.8 µm, 5.9 µm, 6 µm, or in a range defined by any two of these values.

In the embodiments of this application, the thickness of the negative electrode current collector has a meaning known in the art and can be tested using the equipment and methods known in the art. For example, the negative electrode plate is used as a sample, then the negative electrode film layer on the surface of the negative electrode plate is washed off with an organic solvent such as alcohol, and the thickness of the negative electrode current collector is measured with a micrometer.

The negative electrode film layer is usually formed by applying a negative electrode slurry onto the negative electrode current collector and performing drying and cold pressing. The negative electrode slurry is typically formed by dispersing the negative electrode active material, the optional conductive agent, the optional binder, and the optional another promoter in a solvent and stirring them to uniformity. The solvent may be but is not limited to N-methylpyrrolidone (NMP) or deionized water.

The negative electrode plate does not exclude additional functional layers other than the negative electrode film layer. For example, in some embodiments, the negative electrode plate in the embodiments of this application further includes a conductive primer layer (for example, made of a conductive agent and a bonding agent) sandwiched between the negative electrode current collector and the negative electrode film layer and disposed on a surface of the negative electrode current collector. In some other embodiments, the negative electrode plate in the embodiments of this application further includes a protective layer covering a surface of the negative electrode film layer.

[Separator]

In some embodiments, the lithium-ion battery may further include a separator, where a porosity of the separator is 30% to 45%.

Due to the relatively high addition amount of lithium hexafluorophosphate, the electrolyte has a relatively high overall viscosity. The relatively high porosity of the separator is conducive to the permeation of the high-viscosity electrolyte through the separator, allowing lithium ions to migrate smoothly.

For example, the porosity of the separator may be 30%, 31%, 32%, 33%, 34%, 35%, 36%, 37%, 38%, 39%, 40%, 41%, 42%, 43%, 44%, 45%, or in a range defined by any two of these values.

In the embodiments of this application, porosity refers to a percentage of the volume of pores in the separator relative to the total volume of the separator. The porosity can be tested according to GB/T 36363-2018 Polyolefin separator for lithium-ion battery.

In some embodiments, the separator includes an organic substrate and a coating disposed on at least one side of the organic substrate. The coating includes a ceramic layer and/or a polyacrylate layer. The coating may include only a ceramic layer, or only a polyacrylate layer, or both a ceramic layer and a polyacrylate layer.

Optionally, in a case that the coating includes both a ceramic layer and a polyacrylate layer, the polyacrylate layer can be disposed on at least one surface of the organic substrate, and the ceramic layer is disposed on a surface of the polyacrylate layer facing away from the organic substrate. Alternatively, the ceramic layer can be disposed on at least one surface of the organic substrate, and the polyacrylate layer is disposed on a surface of the ceramic layer facing away from the organic substrate.

With the polyacrylate layer disposed on the outer surface of the separator, the outer surface of the separator has a certain flexibility, which can effectively alleviate the volume swelling or shrinkage of the silicon-based material, enhancing the overall structural stability of the electrode assembly.

The material of the organic substrate is not particularly limited and can be any known base film with good chemical and mechanical stability. For example, the organic substrate includes at least one of a porous polyolefin resin film (for example, at least one of polyethylene, polypropylene, polytetrafluoroethylene, polyvinyl fluoride, and polyvinylidene fluoride), porous glass fiber, and porous nonwoven fabric. The organic substrate may be a single-layer film or a multilayer composite film. When the organic substrate is a multilayer composite film, the layers may be made of a same material or different materials.

In some embodiments, a thickness of the organic substrate is 6.6 µm to 7.6 µm.

When the thickness of the organic substrate is within the above range, the transmission rate of lithium ions in the negative electrode plate is substantially consistent with the transmission rate in the separator, reducing the risk of exacerbating the concentration polarization, and helping to improve the discharge performance.

For example, the thickness of the organic substrate may be 6.6 µm, 6.7 µm, 6.8µ, 6.9 µm, 7.0 µm, 7.1µ, 7.2 µm, 7.3 µm, 7.4 µm, 7.5 µm, 7.6 µm, or in a range defined by any two of these values.

In some embodiments, the polyacrylate in the polyacrylate layer can be formed by polymerizing polymer monomers. The polymer monomers include at least one of a first polymer monomer, a second polymer monomer, and a third polymer monomer. Optionally, the polymer monomers include a first polymer monomer, a second polymer monomer, and a third polymer monomer. The polyacrylate formed by polymerizing the above three polymer monomers can provide the separator with suitable adhesion to the electrode plate, improving the kinetic performance of the lithium-ion battery.

The first polymer monomer has at least one ester bond, optionally one or more of methyl acrylate, ethyl acrylate, n-propyl acrylate, n-butyl acrylate, isobutyl acrylate, sec-butyl acrylate, tert-butyl acrylate, cyclohexyl acrylate, lauryl acrylate, 2-ethylhexyl acrylate, 2-hydroxyethyl acrylate, 2-hydroxypropyl acrylate, methyl methacrylate, ethyl methacrylate, n-butyl methacrylate, 2-ethylhexyl methacrylate, isobornyl methacrylate, lauryl methacrylate, 2-hydroxyethyl methacrylate, 2-hydroxypropyl methacrylate, vinyl acetate, trifluoroethyl methacrylate, glycidyl methacrylate, or trimethylolpropane triacrylate, and more optionally, one or more of methyl methacrylate, lauryl acrylate, lauryl methacrylate, or trimethylolpropane triacrylate.

The second polymer monomer has at least one cyano bond, optionally one or more of acrylonitrile, methacrylonitrile, and ethyl acrylonitrile, and more optionally, one or more of acrylonitrile and methacrylonitrile.

The third polymer monomer has at least one amide bond, optionally one or more of acrylamide, N-hydroxymethyl acrylamide, and N-butoxymethyl acrylamide, and more optionally, one or more of acrylamide and N-hydroxymethyl acrylamide.

In some embodiments, a weight ratio of the first polymer monomer, the second polymer monomer, and the third polymer monomer that form the polyacrylate is (45-70):(10-25):(10-35), for example, (50-70):(10-25):(10-35), (55-70):(10-25):(10-35), (60-70):(10-25):(10-35), (65-70):(10-25):(10-35), (45-70):(15-25):(10-35), (45-70):(20-25):(10-35), (45-70):(22-25):(10-35), (45-70):(10-25):(15-35), (45-70):(10-25):(20-35), (45-70):(10-25):(25-35), (45-70):(10-25):(30-35), or (45-70):(10-25):(32-35).

In some embodiments, the ceramic layer includes inorganic particles with heat resistance. The inorganic particles may include at least one of inorganic particles with a dielectric constant of 5 or above, inorganic particles capable of transmitting active ions, and inorganic particles capable of undergoing electrochemical oxidation and reduction.

In some embodiments, the inorganic particles with a dielectric constant of 5 or above may include at least one of boehmite ($\gamma$-AlOOH), aluminum oxide ($Al_2O_3$), barium sulfate ($BaSO_4$), magnesium oxide (MgO), magnesium hydroxide ($Mg(OH)_2$), silicon oxide SiOx ($0<x\leq2$), tin dioxide ($SnO_2$), titanium oxide ($TiO_2$), calcium oxide (CaO), zinc oxide (ZnO), zirconium oxide ($ZrO_2$), yttrium oxide ($Y_2O_3$), nickel oxide (NiO), hafnium dioxide ($HfO_2$), cerium oxide ($CeO_2$), zirconium titanate ($ZrTiO_3$), barium titanate ($BaTiO_3$), magnesium fluoride ($MgF_2$), $Pb(Zr,Ti)O_3$ (abbreviated as PZT), $Pb_{1-m}La_mZr_{1-n}Ti_nO_3$ (abbreviated as PLZT, $0<m<1$, and $0<n<1$), and $Pb(Mg_3Nb_{2/3})O_3$—$PbTiO_3$ (abbreviated as PMN-PT).

In some embodiments, the inorganic particles capable of transmitting active ions may include at least one of lithium phosphate ($Li_3PO_4$), lithium titanium phosphate ($Li_xTi_y(PO_4)_3$, where $0<x<2$ and $0<y<3$), lithium aluminum titanium phosphate ($Li_xAl_yTi_z(PO_4)_3$, where $0<x<2$, $0<y<1$, and $0<z<3$), $(LiAlTiP)_xO_y$ type glass (where $0<x<4$ and $0<y<13$), lithium lanthanum titanate ($Li_xLa_yTiO_3$, where $0<x<2$ and $0<y<3$), lithium germanium thiophosphate ($Li_xGe_yP_zS_w$, where $0<x<4$, $0<y<1$, $0<z<1$, and $0<w<5$), lithium nitride ($Li_xN_y$, where $0<x<4$ and $0<y<2$), $SiS_2$ type glass ($Li_xSi_yS_z$, where $0<x<3$, $0<y<2$, and $0<z<4$), and $P_2S_5$ type glass ($Li_xP_yS_z$, where $0<x<3$, $0<y<3$, and $0<z<7$).

In some embodiments, the inorganic particles capable of undergoing electrochemical oxidation and reduction may include at least one of lithium-containing transition metal oxide, olivine-structured lithium-containing phosphate, carbon-based material, silicon-based material, tin-based material, and lithium titanium compound.

In some embodiments, the ceramic layer may further include a binder. Optionally, the binder includes at least one of polyacrylate, acrylic acid, carboxymethyl cellulose, polyvinylidene fluoride-co-trichloroethylene copolymer, polymethyl methacrylate, polyvinylpyrrolidone, polyvinyl acetate, polyethylene-co-vinyl acetate copolymer, polyethylene oxide, polyaromatic ester, cellulose acetate, cellulose butyrate acetate, cellulose propionate acetate, polyvinylidene fluoride, polyacrylonitrile, polyvinyl alcohol, starch, hydroxypropyl cellulose, regenerated cellulose, polytetrafluoroethylene, polyethylene, polypropylene, and cyanoethyl branched starch.

In some embodiments, a thickness of the coating is 1.5 µm to 2.5 µm.

The thickness of the coating is a thickness of the coating on one side, specifically including a total thickness of the ceramic layer and the polyacrylate layer. For example, if the organic substrate has coatings on both sides, the thickness of the coating on one side of the organic substrate is the thickness of the single-side coating; or if the organic substrate has a coating on one side only, the thickness of the coating on that side is the thickness of the single-side coating. When the thickness of the coating is within the above range, the transmission rate of lithium ions in the negative electrode plate is substantially consistent with the transmission rate in the separator, reducing the risk of exacerbating the concentration polarization, and helping to improve the discharge performance.

For example, the thickness of the coating may be 1.5 µm, 1.6 µm, 1.7 µm, 1.8 µm, 1.9 µm, 2.0 µm, 2.1 µm, 2.2 µm, 2.3 µm, 2.4 µm, 2.5 µm, or in a range defined by any two of these values.

In some embodiments, a ratio of the thickness of the ceramic layer to the thickness of the polyacrylate layer may be (0.5-2.0):1, for example, 0.5:1, 0.7:1, 0.8:1, 0.9:1, 1.0:1, 1.1:1, 1.2:1, 1.3:1, 1.4:1, 1.5:1, 1.6:1, 1.7:1, 1.8:1, 1.9:1, 2.0:1, or in a range defined by any two of these values.

In the embodiments of this application, the thickness of the organic substrate and the thickness of the coating have meanings known in the art and can be tested using the equipment and methods known in the art. For example, an ion section polisher and a scanning electron microscope can be jointly used for testing. For example, testing can be performed according to the following steps: cutting the separator into samples under test of a specific size (for example, 6 mm×6 mm); clamping the sample under test by using two electrically and thermally conductive sheets (for example, copper foils), fixing the sample under test and the sheets by using glue (for example, a double-sided tape), and pressing the sample under test and the sheets through a flat iron block with specific mass (for example, approximately 400 g) for a specified period of time (for example, 1 h) to reduce a gap between the sample under test and the copper foils to be as small as possible; trimming edges with scissors, and attaching the sample on the sample stage by using conductive glue, where the sample slightly protrudes from the edge of the sample stage; placing the sample stage in a sample holder and locking the sample holder firmly, powering on an argon ion cross-section polisher and performing evacuation (for example, 10 Pa-4 Pa), setting argon flow (for example, 0.15 MPa), voltage (for example, 8 kV), and polishing time (for example, 2 hours), and adjusting the sample stage to rocking mode to start polishing; and after the polishing is complete, obtaining the ion polishing cross-sectional topography (CP) image of the sample under test by using a scanning electron microscope (for example, ZEISS Sigma 300), and measuring the thickness of the coating and the thickness of the organic substrate.

In some embodiments, the positive electrode plate, separator, and negative electrode plate can be made into an electrode assembly through winding and/or lamination processes. It can be understood that the electrode assembly may be a wound electrode assembly or a laminated electrode assembly. Optionally, the electrode assembly is a laminated electrode assembly. The laminated electrode assembly makes the positive electrode plate and the negative electrode plate more closely packed, further reducing the DCR.

In some embodiments, the lithium-ion battery may include an outer package. The outer package may be used for packaging the foregoing electrode assembly and electrolyte.

In some embodiments, the outer package of the lithium-ion battery may be a hard shell, for example, a hard plastic shell, an aluminum shell, or a steel shell. The outer package of the lithium-ion battery may alternatively be a soft pack, for example, a soft pouch. A material of the soft package may be plastic, for example, at least one of polypropylene (PP), polybutylene terephthalate (PBT), and polybutylene succinate (PBS).

The lithium-ion battery is not limited to any particular shape in the embodiments of this application, and the lithium-ion battery may be cylindrical, rectangular, or of any other shape. FIG. 1 shows a lithium-ion battery 5 of a rectangular structure as an example.

Figure 2:
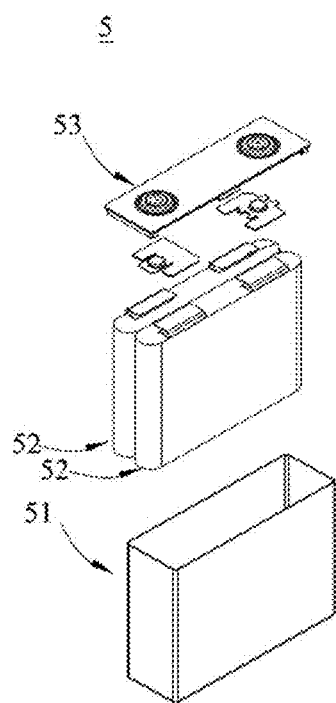
FIG. 2 is a schematic exploded view of the embodiment of the lithium-ion battery in FIG. 1.

In some embodiments, as shown in FIG. 2, the outer package may include a housing 51 and a cover plate 53. The housing 51 may include a base plate and side plates connected to the base plate, and the base plate and the side plates enclose an accommodating cavity. The housing 51 has an opening communicating with the accommodating cavity, and the cover plate 53 is configured to cover the opening to close the accommodating cavity. A positive electrode plate, a negative electrode plate, and a separator may be made into an electrode assembly 52 through winding and/or lamination processes. The electrode assembly 52 is packaged in the accommodating cavity. The electrolyte infiltrates the electrode assembly 52. There may be one or more electrode assemblies 52 in the lithium-ion battery 5, and the quantity may be adjusted as required.

The preparation method of the lithium-ion battery in the embodiments of this application is well known. In some embodiments, the positive electrode plate, the separator, the negative electrode plate, and the electrolyte may be assembled to form a lithium-ion battery. For example, the positive electrode plate, the separator, and the negative electrode plate may be made into an electrode assembly through winding and/or lamination processes; and the electrode assembly is put in an outer package which is filled with electrolyte after drying, followed by processes such as vacuum packaging, standing, formation, and shaping, to obtain a lithium-ion battery.

In some embodiments of this application, the lithium-ion batteries in the embodiments of this application may be assembled into a battery module, and a battery module may include a plurality of lithium-ion batteries. The specific quantity may be adjusted according to the use case and capacity of the battery module.

Figure 3:
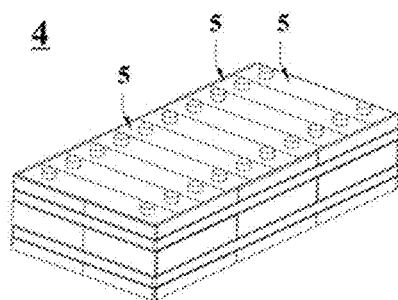
FIG. 3 is a schematic diagram of a battery module according to an implementation of this application.

FIG. 3 is a schematic diagram of a battery module 4 as an example. As shown in FIG. 3, in the battery module 4, a plurality of lithium-ion batteries 5 may be sequentially arranged in a length direction of the battery module 4. Certainly, the batteries may alternatively be arranged in any other manners. Further, the plurality of lithium-ion batteries 5 may be fixed using fasteners.

Optionally, the battery module 4 may further include a housing with an accommodating space, and the plurality of lithium-ion batteries 5 are accommodated in the accommodating space.

In some embodiments, the battery module may be further assembled into a battery pack, and a quantity of battery modules included in the battery pack may be adjusted based on application and capacity of the battery pack.

Figure 4:
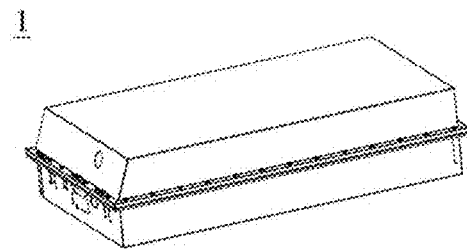
FIG. 4 is a schematic diagram of a battery pack according to an implementation of this application.
Figure 5:
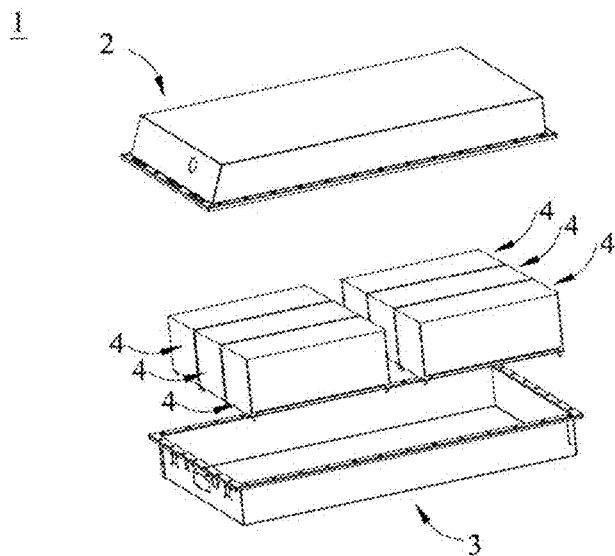
FIG. 5 is a schematic exploded view of the embodiment of the battery pack in FIG. 4.

FIG. 4 and FIG. 5 are schematic diagrams of a battery pack 1 as an example. As shown in FIG. 4 and FIG. 5, the battery pack 1 may include a battery box and a plurality of battery modules 4 arranged in the battery box. The battery box includes an upper box body 2 and a lower box body 3, where the upper box body 2 is configured to cover the lower box body 3 to form an enclosed space for accommodating the battery modules 4. The plurality of battery modules 4 may be arranged in the battery box in any manner.

Electric Apparatus

According to a third aspect, an embodiment of this application provides an electric apparatus. The electric apparatus includes at least one of the lithium-ion battery provided in the embodiments of this application, a battery module, or a battery pack. The lithium-ion battery, the battery module, or the battery pack may be used as a power source of the electric apparatus or an energy storage unit of the electric apparatus. The electric apparatus may be but is not limited to a mobile device (for example, a mobile phone or a laptop computer), an electric vehicle (for example, a battery electric vehicle, a hybrid electric vehicle, a plug-in hybrid electric vehicle, an electric bicycle, an electric scooter, an electric golf vehicle, or an electric truck), an electric train, a ship, a satellite, or an energy storage system.

A lithium-ion battery, a battery module, or a battery pack may be selected for the electric apparatus based on requirements for using the electric apparatus.

Figure 6:
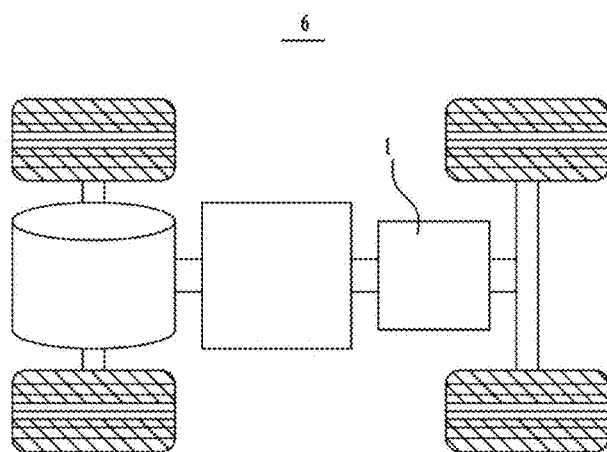
FIG. 6 is a schematic diagram of an embodiment of an electric apparatus using the lithium-ion battery of this application as a power source.

FIG. 6 is a schematic diagram of an electric apparatus 6 as an example. The electric apparatus 6 is a battery electric vehicle, a hybrid electric vehicle, a plug-in hybrid electric vehicle, or the like. To meet a requirement of the electric apparatus 6 for high power and high energy density of the electrochemical apparatus, a battery pack or a battery module may be used.

In another example, the electric apparatus may be a mobile phone, a tablet computer, a laptop computer, or the like. The electric apparatus is generally required to be light and thin, and may use the lithium-ion battery as a power source.

EXAMPLES

Content disclosed in the embodiments of this application is described in more detail in the following examples. These examples are merely intended for illustrative purposes because various modifications and changes made without departing from the scope of the content disclosed in the embodiments of this application are apparent to persons skilled in the art. Unless otherwise stated, all parts, percentages, and ratios reported in the following examples are based on masses, all reagents used in the examples are commercially available or synthesized in a conventional manner, and can be used directly without further treatment, and all instruments used in the examples are commercially available.

Example 1

1. Preparation of Positive Electrode Plate

The positive electrode plate includes a positive electrode current collector and a positive electrode film layer. The positive electrode current collector is an aluminum foil with a thickness of 10 μm. The positive electrode film layer includes a film formed by uniformly applying the positive electrode slurry (solvent is N-methylpyrrolidone NMP) on a surface of the aluminum foil of the positive electrode current collector and performing drying and cold pressing. The positive electrode film layer includes a positive electrode active material, conductive agent carbon black, and binder polyvinylidene fluoride (PVDF) at a weight ratio of 97.5:1.4:1.1. The press density of the positive electrode film layer is 3.35 g/cm$^3$.

The positive electrode active material has a single crystal structure, including a compound with a molecular formula $Li_dNi_aCo_bMn_cM_{(1-a-b-c)}O_z$, where the nickel-cobalt-manganese oxide matrix of the positive electrode active material includes a compound with a molecular formula $LiNi_{0.70}Co_{0.10}Mn_{0.20}O_2$.

Element M includes 450 ppm element Ti, 1700 ppm element Zr, 1600 ppm element Al, and 120 ppm (elements B, S, and P).

2. Preparation of Negative Electrode Plate

The negative electrode plate includes a negative electrode current collector and a negative electrode film layer. The negative electrode current collector is a copper foil with a thickness of 4.5 μm. The negative electrode film layer includes a film formed by uniformly applying the negative electrode slurry (with the solvent being deionized water) on the surface of the copper foil of the negative electrode current collector and performing drying and cold pressing. The negative electrode film layer includes a negative electrode active material, binder styrene-butadiene rubber (SBR), thickener sodium carboxymethyl cellulose (CMC-Na), and conductive agent carbon black (Super P) at a weight ratio of 96.2:1.8:1.2:0.8.

The negative electrode active material includes 97% artificial graphite and 3% silicon oxide SiO, with the mass proportion of element silicon relative to the total mass of the negative electrode active material being 1.91%. The press density of the negative electrode film layer is 1.4 g/cm$^3$.

3. Separator

The separator can be directly purchased from the separator supplier. The separator has a porosity of 30%, and includes an organic substrate (porous polypropylene PP (7 μm)) and a coating. The coating includes a ceramic layer (1 μm) and a polyacrylate layer (1 μm). The ceramic layer is disposed on both surfaces of the organic substrate. The ceramic layer includes a film layer formed by dissolving a binder and inorganic aluminum oxide in N-methylpyrrolidone NMP and applying the resulting slurry onto the organic substrate. The polyacrylate layer is disposed on the surface of the ceramic layer facing away from the organic substrate, and the polyacrylate layer is a film layer formed by applying a substance containing polyacrylate onto the surface of the ceramic layer.

4. Preparation of an Electrolyte Solution

The electrolyte includes an organic solvent, lithium salt, and an additive. The organic solvent includes cyclic carbonates (EC, PC, and BC, with a mass ratio of 1:1:1) and linear carbonates (EMC, DMC, and DEC, with a mass ratio of 1:1:1).

5. Preparation of Battery

The positive electrode plate, separator, and negative electrode plate were sequentially stacked, with the separator positioned between the positive electrode plate and the negative electrode plate to provide separation, and then the resulting stack was wound to obtain an electrode assembly. The electrode assembly was placed into an outer package, followed by drying and electrolyte injection. Processes such as vacuum packaging, standing, formation, and shaping were performed to obtain a lithium-ion battery. The electrolyte retention coefficient of the lithium-ion battery was 2.0 g/Ah.

Comparative Example 1

The lithium-ion battery was prepared using a method similar to that in Example 1, except that the positive electrode active material in Comparative Example 1 did not contain element M.

Comparative Examples 2 and 3

The lithium-ion batteries were prepared using a method similar to that in Example 1, except that the components of the electrolyte were adjusted in Comparative Example 2 and Comparative Example 3, particularly the proportion of lithium hexafluorophosphate.

Example 2

The lithium-ion battery was prepared using a method similar to that in Example 1, except that the morphology of the positive electrode active material in Example 2 was different. The positive electrode active material in Example 2 included polycrystal particles.

Examples 3-1 and 3-2

The lithium-ion batteries were prepared using a method similar to that in Example 1, except that the components of the electrolyte were adjusted in Examples 3-1 and 3-2, particularly the proportion of lithium hexafluorophosphate.

Examples 4-1 to 4-4

The lithium-ion batteries were prepared using a method similar to that in Example 1, except that the positive electrode active materials in Examples 4-1 to 4-4 were different. The proportion of at least one of Ti and Zr in element M of the positive electrode active materials was adjusted.

Examples 4-5 to 4-7

The lithium-ion batteries were prepared using a method similar to that in Example 1, except that the electrolytes in Examples 4-5 to 4-7 were different. The proportion of the first additive was adjusted.

Examples 5-1 and 5-2

The lithium-ion batteries were prepared using a method similar to that in Example 1, except that the positive electrode active materials in Examples 5-1 and 5-2 were different. The proportion of Al in element M of the positive electrode active materials was adjusted.

Examples 5-3 to 5-4

The lithium-ion batteries were prepared using a method similar to that in Example 1, except that the electrolytes in Examples 5-3 to 5-4 were different. The proportion of the second additive was adjusted.

Examples 6-1 to 6-3

The lithium-ion batteries were prepared using a method similar to that in Example 1, except that the positive electrode active materials and electrolytes in Examples 6-1 to 6-3 were different. The total proportion of P, B, and S in element M was adjusted, and the proportion of the third additive in the electrolyte was adjusted.

Examples 7-1 and 7-2

The lithium-ion batteries were prepared using a method similar to that in Example 1, except that the electrolytes in Examples 7-1 and 7-2 were different. The electrolyte included fluorinated cyclic carbonate.

Example 8

The lithium-ion battery was prepared using a method similar to that in Example 1, except that the electrolyte in Example 8 was different. The electrolyte included the fourth additive.

The parameters of the examples and comparative examples are shown in Tables 1 to 3.
Performance Tests
1. Cycling Performance Test on Lithium-Ion Battery At 25° C., the lithium-ion batteries prepared in the examples and comparative examples were charged to 4.35 V at 1C and then discharged to 2.8 V at 1C. This process was repeated for 500 cycles, and the percentage of the remaining capacity of each lithium-ion battery to its initial capacity was recorded.
Test Results The test results are shown in Table 1 to Table 3.

TABLE 1

| | Electrolyte | | | | | | | |
|---|---|---|---|---|---|---|---|---|
| | | Organic solvent | | | First additive | | Second additive | |
| | Lithium salt Proportion of $LiPF_6$ | Proportion of cyclic carbonate | Content ratio of cyclic carbonate to $LiPF_6$ | Proportion of linear carbonate | Proportion of fluorine-containing inorganic borate LiDFOB (ppm) | Proportion of fluorine-containing inorganic borate $LiBF_4$ (ppm) | Proportion of fluorine-containing inorganic phosphate $LiPO_2F_2$ (ppm) | Capacity retention rate after 500 cycles |
| Comparative Example 1 | 18.20% | 25.00% | 1.37 | 51.30% | 150 | 200 | 1500 | 73% |
| Comparative Example 2 | 12.00% | 25.00% | 2.08 | 57.50% | 150 | 200 | 1500 | 75% |
| Comparative Example 3 | 23.00% | 25.00% | 1.09 | 46.50% | 150 | 200 | 1500 | 78% |
| Example 1 | 18.20% | 25.00% | 1.37 | 51.30% | 150 | 200 | 1500 | 91% |
| Example 2 | 18.20% | 25.00% | 1.37 | 51.30% | 150 | 200 | 1500 | 89% |
| Example 3-1 | 15.00% | 25.00% | 1.67 | 54.50% | 150 | 200 | 1500 | 90% |
| Example 3-2 | 20.00% | 25.00% | 1.25 | 49.50% | 150 | 200 | 1500 | 89% |

In Table 1, the positive electrode active material in Example 1 has a single crystal structure, including a compound with a molecular formula $LiNi_aCo_bMn_cM_{(1-a-b-c)}O_2$, where the nickel-cobalt-manganese oxide matrix of the positive electrode active material includes a compound with a molecular formula $LiNi_{0.70}Co_{0.10}Mn_{0.20}O_2$. Element M includes 450 ppm element Ti, 1700 ppm element Zr, 1600 ppm element Al, and 120 ppm (elements B, S, and P). The molecular formula of the positive electrode active materials of Example 2, Example 3-1, and Example 3-2 is the same as that of Example 1; Example 2 adopts a polycrystalline structure, and Example 3-1 and Example 3-2 adopt single crystal particles.

The positive electrode active material of Comparative Example 1 includes a compound with a molecular formula $LiNi_{0.70}Co_{0.10}Mn_{0.20}O_2$, and uses single crystal particles.

According to Table 1, although the content of lithium hexafluorophosphate in Comparative Example 1 is high, the positive electrode active material containing $LiNi_{0.70}Co_{0.10}Mn_{0.20}O_2$ in Comparative Example 1 has a poor structural stability, leading to poor cycling performance of the lithium-ion battery.

Comparative Examples 2 and 3 both use suitable positive electrode active material systems, where the positive electrode active material includes element M, and the element M includes Ti, Zr, Al, B, S, P, and the like, enhancing the lattice stability of the positive electrode active material system. However, in Comparative Example 2, a relatively low content of lithium hexafluorophosphate (12%) is used. The relatively low content of lithium hexafluorophosphate generates a relatively small number of lithium fluoride compounds on the surface of the positive electrode active material, which cannot provide good protection for the positive electrode active material. The risk of transition metal ions in the positive electrode active material dissolving into the electrolyte still exists, deteriorating the cycling performance of the battery. In Comparative Example 3, a relatively high content of lithium hexafluorophosphate (23%) is used. The high content of lithium hexafluorophosphate causes the viscosity of the electrolyte system to be excessively high, which is not conducive to the migration of lithium ions, leading to poor kinetic performance of the battery.

The positive electrode active material in Example 1 further includes element M. The introduction of element M can enhance the crystal structure stability of the positive electrode active material. Lithium hexafluorophosphate is also used, with a mass proportion of lithium hexafluorophosphate $LiPF_6$ relative to the total mass of the electrolyte being 15% to 20%. Lithium hexafluorophosphate can form a protective layer primarily composed of lithium fluoride LiF on the surface of the positive electrode active material, mitigating the dissolution of metal and non-metal elements to some extent, thereby improving the cycling performance of the lithium-ion battery. Compared to the positive electrode active material in Example 2 which uses polycrystal particles, the single crystal particles used in Example 1 have relatively fewer contact interfaces with the electrolyte, reducing the risk of side reactions and further enhancing the cycling performance.

TABLE 2

| | Positive electrode active material | | | | First additive | | Second additive | |
|---|---|---|---|---|---|---|---|---|
| | Proportion of Ti (ppm) | Proportion of Zr (ppm) | Proportion of Al (ppm) | Total proportion of B, S, and P (ppm) | Proportion of fluorine-containing inorganic borate LiDFOB (ppm) | Proportion of fluorine-containing inorganic borate $LiBF_4$ (ppm) | Proportion of fluorine-containing inorganic phosphate $LiPO_2F_2$ (ppm) | Capacity retention rate after 500 cycles |
| Example 1 | 450 | 1700 | 1600 | 120 | 150 | 200 | 1500 | 91% |
| Example 4-1 | 100 | 1700 | 1600 | 120 | 150 | 200 | 1500 | 90% |
| Example 4-2 | 600 | 1700 | 1600 | 120 | 150 | 200 | 1500 | 89% |
| Example 4-3 | 450 | 500 | 1600 | 120 | 150 | 200 | 1500 | 88% |
| Example 4-4 | 450 | 2550 | 1600 | 120 | 150 | 200 | 1500 | 88% |
| Example 4-5 | 450 | 1700 | 1600 | 120 | 180 | 200 | 1500 | 90% |
| Example 4-6 | 450 | 1700 | 1600 | 120 | 0 | 30 | 1500 | 86% |
| Example 4-7 | 450 | 1700 | 1600 | 120 | 560 | 600 | 1500 | 84% |
| Example 5-1 | 450 | 1700 | 500 | 120 | 150 | 200 | 1500 | 84% |
| Example 5-2 | 450 | 1700 | 3000 | 120 | 150 | 200 | 1500 | 86% |
| Example 5-3 | 450 | 1700 | 1600 | 120 | 150 | 200 | 100 | 83% |
| Example 5-4 | 450 | 1700 | 1600 | 120 | 150 | 200 | 3000 | 84% |

According to Table 2, in Examples 4-1 to 4-7, the first additive is used in combination with Ti and Zr in the positive electrode active material. Ti and Zr can improve the structural stability of the positive electrode active material, and the first additive can compensate for the power degradation caused by Ti and Zr ions, thereby improving the cycling performance of the lithium-ion battery.

In Examples 5-1 to 5-4, the second additive is used in combination with Al in the positive electrode active material. Especially, lithium difluorophosphate, combined with the element Al in the positive electrode active material, can reduce the DCR on the surface of the positive electrode active material and enhance the interface power.

TABLE 3

| | Positive electrode active material Total proportion of B, S, and P (ppm) | Third additive Proportion of lithium fluorosulfonate (ppm) | Fluorinated cyclic carbonate | | Content ratio of fluorinated cyclic carbonate to element silicon | Fourth additive Proportion of PS/VC | Capacity retention rate after 500 cycles |
|---|---|---|---|---|---|---|---|
| | | | Type | Proportion | | | |
| Example 1 | 120 | 0 | NA | 0 | / | 0 | 91% |
| Example 6-1 | 0 | 100 | NA | 0 | 0.00 | 0 | 87% |
| Example 6-2 | 800 | 100 | NA | 0 | 0.00 | 0 | 88% |
| Example 6-3 | 120 | 100 | NA | 0 | 0.00 | 0 | 92% |
| Example 7-1 | 120 | 100 | FEC | 2.00% | 1.05 | 0 | 93% |
| Example 7-2 | 120 | 100 | FEC | 4.00% | 2.09 | 0 | 90% |
| Example 8 | 120 | 100 | FEC | 2.00% | 1.05 | PS = 0.5% VC = 0.5% | 94% |

According to Table 3, in Examples 6-1 to 6-3, the third additive is used in combination with at least one of elements phosphorus P, sulfur S, and boron B in the positive electrode active material, which can reduce the DCR on the surface of the positive electrode active material and enhance the interface power.

In Examples 7-1 and 7-2, the electrolyte additionally includes fluorinated cyclic carbonate. Fluorinated cyclic carbonate can participate in forming the SEI film on the surface of the negative electrode active material, effectively protecting the negative electrode active material and improving the cycling performance of the lithium-ion battery.

In Example 8, the electrolyte additionally includes the fourth additive. The fourth additive can participate in forming the SEI film on the surface of the negative electrode active material, effectively protecting the negative electrode active material and improving the cycling performance of the lithium-ion battery.

Although illustrative embodiments have been demonstrated and described, persons skilled in the art should understand that the foregoing embodiments are not to be construed as limiting this application, and that the embodiments may be changed, replaced, and modified without departing from the spirit, principle, and scope of this application.

What is claimed is:

1. A lithium-ion battery, comprising:
an electrolyte, comprising lithium salt, wherein the lithium salt comprises lithium hexafluorophosphate, and a mass proportion of the lithium hexafluorophosphate relative to a total mass of the electrolyte is 15% to 20%;
a positive electrode plate, comprising a positive electrode current collector and a positive electrode film layer disposed on at least one side of the positive electrode current collector and containing a positive electrode active material, wherein the positive electrode active material comprises a compound with a molecular formula $Li_dNi_aCo_bMn_cM_{(1-a-b-c)}Q_z$, wherein $0<d\leq2.1$, $0.6<a<1$, $0<b><1$, $0<c<1$, $0.6<a+b+c<1$, and $1.8<z<3.5$; element M comprises at least one of elements Ti and Zr; and element Q comprises at least one of elements O and F;
wherein, the positive electrode active material comprises single crystal particles, the single crystal particle comprises an inner region and an outer region, wherein the outer region is a region extending 500 nm directly from any point on an outer surface of the single crystal particle toward inside of the single crystal particle;
element M comprises element Al, wherein elements Al are distributed at least in the outer region, element M further comprises at least one of elements P, S, and B, wherein at least one of elements P, S, and B is distributed in the outer region; and
the electrolyte comprises a first additive and a third additive, wherein the first additive comprises at least one of lithium difluoroxalate borate LiDFOB and lithium tetrafluoroborate $LiBF_4$, the third additive comprises lithium fluorosulfonate.

2. The lithium-ion battery according to claim 1, wherein element M further comprises at least one of elements B, Mg, Al, Si, P, S, Ca, Sc, V, Cr, Fe, Cu, Zn, Sr, Y, Nb, Mo, Cd, Sn, Sb, Te, Ba, Ta, W, Yb, La, and Ce.

3. The lithium-ion battery according to claim 1, wherein
based on the total mass of the electrolyte, a mass proportion of the first additive is 30 ppm to 1200 ppm;
based on a total mass of the positive electrode active material, a mass proportion of element Ti is 100 ppm to 600 ppm; and/or
based on the total mass of the positive electrode active material, a mass proportion of element Zr is 500 ppm to 2550 ppm.

4. The lithium-ion battery according to claim 1, wherein the electrolyte comprises a second additive, wherein the second additive comprises lithium difluorophosphate.

5. The lithium-ion battery according to claim 4, wherein
based on the total mass of the positive electrode active material, a mass proportion of element Al is 500 ppm to 3000 ppm; and
based on the total mass of the electrolyte, a mass proportion of the second additive is 100 ppm to 3000 ppm.

6. The lithium-ion battery according to claim 1, wherein
based on the total mass of the positive electrode active material, a total mass proportion of elements P, S, and B is 10 ppm to 800 ppm; and
based on the total mass of the electrolyte, a mass proportion of the third additive is 50 ppm to 200 ppm.

7. The lithium-ion battery according to claim 1, wherein the electrolyte comprises cyclic carbonate, and based on the total mass of the electrolyte, a ratio of a mass proportion of the cyclic carbonate to the mass proportion of the lithium hexafluorophosphate is (0.60-2.50):1.

8. The lithium-ion battery according to claim 7, wherein based on the total mass of the electrolyte, the ratio of the mass proportion of the cyclic carbonate to the mass proportion of the lithium hexafluorophosphate is (1.00-1.65):1.

9. The lithium-ion battery according to claim 7, wherein based on the total mass of the electrolyte, the mass proportion of the cyclic carbonate is 20% to 30%; and/or
the cyclic carbonate comprises at least one of ethylene carbonate EC, propylene carbonate PC, and butylene carbonate BC.

10. The lithium-ion battery according to claim 1, wherein the lithium-ion battery further comprises a negative electrode plate, wherein the negative electrode plate comprises a negative electrode current collector and a negative electrode film layer disposed on at least one side of the negative electrode current collector and containing a negative electrode active material, the negative electrode active material comprises element carbon and element silicon, and based on a total mass of the negative electrode active material, a ratio of a mass proportion of the element silicon to a mass proportion of the element carbon is (0.3:99.7) to (3:97).

11. The lithium-ion battery according to claim 10, wherein
the electrolyte comprises fluorinated cyclic carbonate, and a ratio of a mass proportion of the fluorinated cyclic carbonate relative to the total mass of the electrolyte to the mass proportion of the element silicon is (0.5-9.5):1.

12. The lithium-ion battery according to claim 11, wherein
the ratio of the mass proportion of the fluorinated cyclic carbonate relative to the total mass of the electrolyte to the mass proportion of the element silicon is (1-2):1.

13. The lithium-ion battery according to claim 11, wherein based on the total mass of the electrolyte, the mass proportion of the fluorinated cyclic carbonate is 0.95% to 5.8%; and/or
the fluorinated cyclic carbonate comprises at least one of monofluoroethylene carbonate FEC, difluoroethylene carbonate DFEC, and trifluoropropylene carbonate TFPC.

14. The lithium-ion battery according to claim 13, wherein
based on the total mass of the electrolyte, the mass proportion of the fluorinated cyclic carbonate is 1.5% to 3%; and/or
the fluorinated cyclic carbonate comprises monofluoroethylene carbonate FEC.

15. The lithium-ion battery according to claim 10, wherein
a ratio of a press density of the positive electrode film layer to a press density of the negative electrode film layer is (2-2.5):1.

16. The lithium-ion battery according to claim 1, wherein
the electrolyte further comprises a fourth additive, and the fourth additive comprises at least one of 1,3-propane sultone PS, vinylene carbonate VC, and lithium fluorosulfonate $LiSO_3F$.

17. The lithium-ion battery according to claim 16, wherein
based on the total mass of the electrolyte, a mass proportion of the 1,3-propane sultone PS is 0.1% to 1%; and/or
based on the total mass of the electrolyte, a mass proportion of the vinylene carbonate VC is 0.1% to 1%.

18. A battery, comprising the lithium-ion battery according to claim 1.

19. An electric apparatus, comprising the battery according to claim 18.

* * * * *